US007353182B1

(12) United States Patent
Missinhoun et al.

(10) Patent No.: US 7,353,182 B1
(45) Date of Patent: Apr. 1, 2008

(54) SYSTEM AND METHOD FOR PROVIDING A MULTI-CHANNEL CUSTOMER INTERACTION CENTER

(75) Inventors: Jean L. Missinhoun, Highland Park, NJ (US); Thomas G. Tynan, Houston, TX (US); Robert P. Drzewicki, New York, NY (US)

(73) Assignee: Accenture LLP, Palo Alto, CA (US)

( * ) Notice: Subject to any disclaimer, the term of this patent is extended or adjusted under 35 U.S.C. 154(b) by 325 days.

(21) Appl. No.: 09/608,293

(22) Filed: Jun. 30, 2000

(51) Int. Cl.
*G06Q 10/00* (2006.01)
(52) U.S. Cl. .......................................... 705/8; 705/10
(58) Field of Classification Search .................. 705/8, 705/10
See application file for complete search history.

(56) References Cited

U.S. PATENT DOCUMENTS

| | | | |
|---|---|---|---|
| 5,737,726 A | 4/1998 | Cameron et al. | |
| 5,963,635 A | 10/1999 | Szlam et al. | |
| 6,064,973 A * | 5/2000 | Smith et al. | 705/7 |
| 6,078,892 A * | 6/2000 | Anderson et al. | 705/10 |
| 6,334,110 B1 * | 12/2001 | Walter et al. | 705/14 |
| 6,389,400 B1 * | 5/2002 | Bushey et al. | 705/7 |
| 6,574,605 B1 * | 6/2003 | Sanders et al. | 705/8 |
| 2001/0047270 A1 * | 11/2001 | Gusick et al. | 705/1 |
| 2001/0054064 A1 * | 12/2001 | Kannan | 709/203 |
| 2002/0046086 A1 * | 4/2002 | Pletz et al. | 705/14 |
| 2004/0028213 A1 * | 2/2004 | Goss | 379/265.09 |

FOREIGN PATENT DOCUMENTS

EP 0802664 A2 * 10/1997

OTHER PUBLICATIONS

Anonymous, The New Call Center: Not just for calls anymore, May 1996, Telemarketing & Call Center Solutions, v14n11, pp. 64-67 [DIALOG: File 15].*
Harvey, Thomson, What Do your Customers Really Want? (Special Focus: Marketing Strategies), Jul.-Aug. 1998, Journal of Business Strategy, v19n4, p. 17.*

* cited by examiner

*Primary Examiner*—Beth Van Doren
*Assistant Examiner*—Andre Boyce
(74) *Attorney, Agent, or Firm*—Brinks Hofer Gilson & Lione

(57) ABSTRACT

A method and apparatus allow a customer service representative (CSR) to conduct personalized interaction based on the value of the customer to the organization. A customer seeking to interact with a CSR is first presented with a list of available interaction options. The list of available interaction options is based on the customer's value to the organization such that the more valuable a customer is, the more options that will be made available to him or her for the interaction. The present invention determines a customer's value to an organization by monitoring a customer's purchase history with respect to the organization over a period of time and computing a customer value based on the frequency and amount of the customer's purchases. A customer service representative is further able to personalize the interaction based on previous interactions between the customer and the customer interaction center by accessing a contact history database.

14 Claims, 22 Drawing Sheets

SYSTEM AND METHOD FOR PROVIDING A MULTI-CHANNEL CUSTOMER INTERACTION CENTER

FIELD OF THE INVENTION

The present invention relates to a multi-channel customer interaction system and method, and more particularly to a multi-channel customer interaction system that provides a customized and optimized interaction across sales, marketing and service to customers based on customer insights including previous interactions with the customer.

DESCRIPTION OF THE RELATED ART

Customers interact with financial institutions for a variety of reasons: to transact financial business, check balances, enter claims, review account status, purchase new products, make travel plans and seek health advice, to name just a few. They often interact with companies in a wide variety of ways—including telephone, cell phone, fax, e-mail, the Internet, kiosks, and written correspondence. These same customers expect and demand consistent, quality experiences delivered in an efficient, cost effective and convenient manner independent of the type of inquiry, interaction method, medium, or time of day. Customers will continue to have the option to take their business to someone who understands and can meet their expectations and in today's competitive business environment, financial institutions may only have one opportunity to "get it right".

Businesses that interact with large numbers of customers and clients, over a variety of channels have found that consumers of a first product or service generally prefer the same related products and services. For example, a person buying a new or used car is more likely to acquire automobile insurance than a person who just purchased a ticket on an cruise liner transiting the South Pacific. Similarly, a person calling a customer service center generally prefers assistance that caters to his/her personality traits (e.g., language skills, educational level, patience, etc.) In other words, a customer seeking assistance is not as likely to be satisfied with the experience or receive the requested information if the customer service representative (CSR) does not speak the customer's language or if the customer service representation is unable to explain a resolution to the customer's problem in a way that the customer is able to understand.

To address this reality, companies have begun logging all customer interactions in an effort to identify and repeat well-received customer interaction practices, while simultaneously identifying and discontinuing conduct that has in the past resulted in a less than positive experience for the customer. In this context, logging refers to the process of recording questions, answers, problems and triumphs that arise during a particular interaction. After a conducting a sufficient amount of logging, organizations have found that clear trends emerge. That is, companies are better prepared to identify specific goods and services that are more likely to be purchased by a particular consumer and, what CSR behavior is more likely to elicit positive and negative responses from a customer. This logged information can also be used to provide better service to the customers and clients and for identifying existing customers to whom new services should be offered. For example, in a telephone call center, the information on a caller's recent interactions may be automatically displayed to an agent handling a particular call. These recent interactions may be provided to the CSR on a computer screen in the form of a "pop up display," providing the representative with information about the caller, his/her purchasing history and candidate possibilities for resolving the customer's problem. In operation, the calling number obtained through the telephone network can be used to look up a customer record and that record can be displayed to the agent.

Solving the problem of providing a positive experience for the customer is more complicated in the age of the Internet as channels of communication assume many different forms. For example, one customer may send an email message to a CSR, another may telephone the representative, a third may prefer to communicate interactively over a computer network via a Web site or chat room, and still another may prefer to communicate across several mediums simultaneously. A single customer may alternatively utilize multiple mediums. When a single customer interacts with the business over a variety of channels, the transaction records from the various channels must be merged to provide a complete record for that customer. The diverse records must also be capable of being reconciled so that a comprehensive approach to interacting to a specific customer can be developed and implemented. Organizations have quite expectedly found that the process of merging transaction records requires considerable effort and data processing capability. Furthermore, the procedures used to merge the records and consolidate feedback have thus far led to a limited dissemination of the information from one medium to the next. As an example, the lessons learned by interacting with a customer over the telephone have thus far not been applied to on-line interactions.

SUMMARY OF THE INVENTION

The goal of this invention is to meet customers' rising expectations by transforming the customer experience and bringing customer interaction to the next level—to integrate conventional and wireless web and e-mail with traditional interaction channels (telephone, Internet, premise-based, kiosk, wireless, etc.) and provide a consistent, personalized experience. The result is a unique, fully-integrated, and comprehensive customer interaction solution-one that bridges the gap between self-service and full service capabilities while gathering customer insight and presenting custom tailored sales, marketing and servicing opportunities.

This end-to-end innovative business solution enables financial institutions, retailers and other on-line marketers to create, via any channel, the level of customer intimacy and support on a real-time basis that only face-to-face customer interactions have offered in the past. The solution seamlessly transforms traditional call centers into powerful customer interaction centers, capable of handling multiple customer driven interaction methods—from the telephone, web, e-mail as well as a hybrid of phone/web collaboration.

The 'eCustomer Interaction Center' significantly optimizes customer relationships by linking web self-directed sales and service with human assistance, ensuring a unified, consistent customer experience. This kind of unified customer interaction environment allows for an unprecedented level of interaction and support, and as a result, increases customer loyalty and adds value to the bottom line. Moreover, this integrated business solution provides customers with a full range of web self-service capabilities by allowing customers who browse an organization's Web site to review account status, general product information, complete a product application, complete the sale, and perform service transactions. It also catapults web-based interaction to the next level by further enabling customers to ask questions and get human assistance via the web. Customers can request assistance directly from the web by indicating their preferred contact method, including e-mail, a later callback, an immediate callback using a second telephone line, a chat window, or immediate voice interaction—using their multimedia computers and Internet telephony to "talk through the PC." This last option also allows the customer to see a live video image of the CSR (assuming the eCIC is equipped with video cameras set to transmit video). All of the options available to the customer would be based on the customer's value to the organization and can be dynamically shown at the time of need; i.e., at the point of interaction.

Real-time customer/agent communication is only the beginning. Once connected, the customer experience is enhanced through the sharing of visual content on the web as the customer and agent converse. The 'eCustomer Interaction Center' allows the customer and agent to view web content simultaneously, push web pages to each other, jointly complete online forms, use a page sharing feature to mark-up the shared web page view and electronically chat-making the interaction a true collaboration. In addition, e-mail communication is enhanced as part of this solution. Upon submitting a web e-mail form, the customer immediately receives an e-mail acknowledgment from the organization with the anticipated response time. Furthermore, as an agent views the original e-mail, additional contextual customer specific information and an automatically suggested response are provided to the CSR to ensure a timely and accurate response.

This solution further enhances companies' customer insight capabilities by capturing and integrating web context information into a common customer information database. The organization can "mine" the database, develop fact-based insights, and share customer-specific insights across the organization in order to shape subsequent customer interactions. This solution captures the information which allows companies to focus on customer preferences, the most effective interaction channels and, ultimately, the most profitable customers.

Additional objectives, features and advantages of the invention are set forth in the following description, apparent from the description, or may be learned by practicing the invention. Both the foregoing general description and the following detailed description are exemplary and explanatory and are intended to provide further explanation of the invention as claimed.

BRIEF DESCRIPTION OF THE DRAWINGS

The accompanying drawings, which are incorporated in and constitute a part of this specification, illustrate embodiments of the invention and, together with the description, serve to explain the objects, advantages, and principles of the invention.

In the drawings:

FIG. 7 is a depiction of a CSR access window for accessing the multi-channel customer interaction center;

FIG. 16 is a depiction of a CSR interface screen;

FIG. 18 is a depiction of a CSR interface screen;

DETAILED DESCRIPTION OF THE PREFERRED EMBODIMENTS

In the following detailed description of the preferred embodiment, reference is made to the accompanying drawings that form a part thereof, and in which is shown by way of illustration a specific embodiment in which the invention may be practiced. This embodiment is described in sufficient detail to enable those skilled in the art to practice the invention and it is to be understood that other embodiments may be utilized and that structural changes may be made without departing from the scope of the present invention. The following detailed description is, therefore, not to be taken in a limited sense.

Before describing the system of the present invention it would be helpful to discuss the various entities, as identified herein, which interact with the system. A "company" is any organization which sells, markets, or distributes products or services to customers. For example, the company may be a wholesale or retail business, an educational institution, a government office or a multi-national corporation. An "eCustomer interaction center" (eCIC) is a subset of the company which is dedicated to providing marketing, sales and service information to customers about the company's products or services, and to providing other forms of assistance to customers. Most companies have one or more eCICs organized, for example, by geographical area and/or by an area of expertise. For example, one eCIC may be a technical support center for the company's products, while another eCIC may provide all customer interactions in a particular country. The eCICs are staffed by one or more CSRs who are trained to answer questions about the company's products or services and to provide other forms of assistance to customers. A "customer" is an individual who requires information about the company's products or services or who requires assistance from the company's CSRs in connection with a particular problem.

Figure 1:
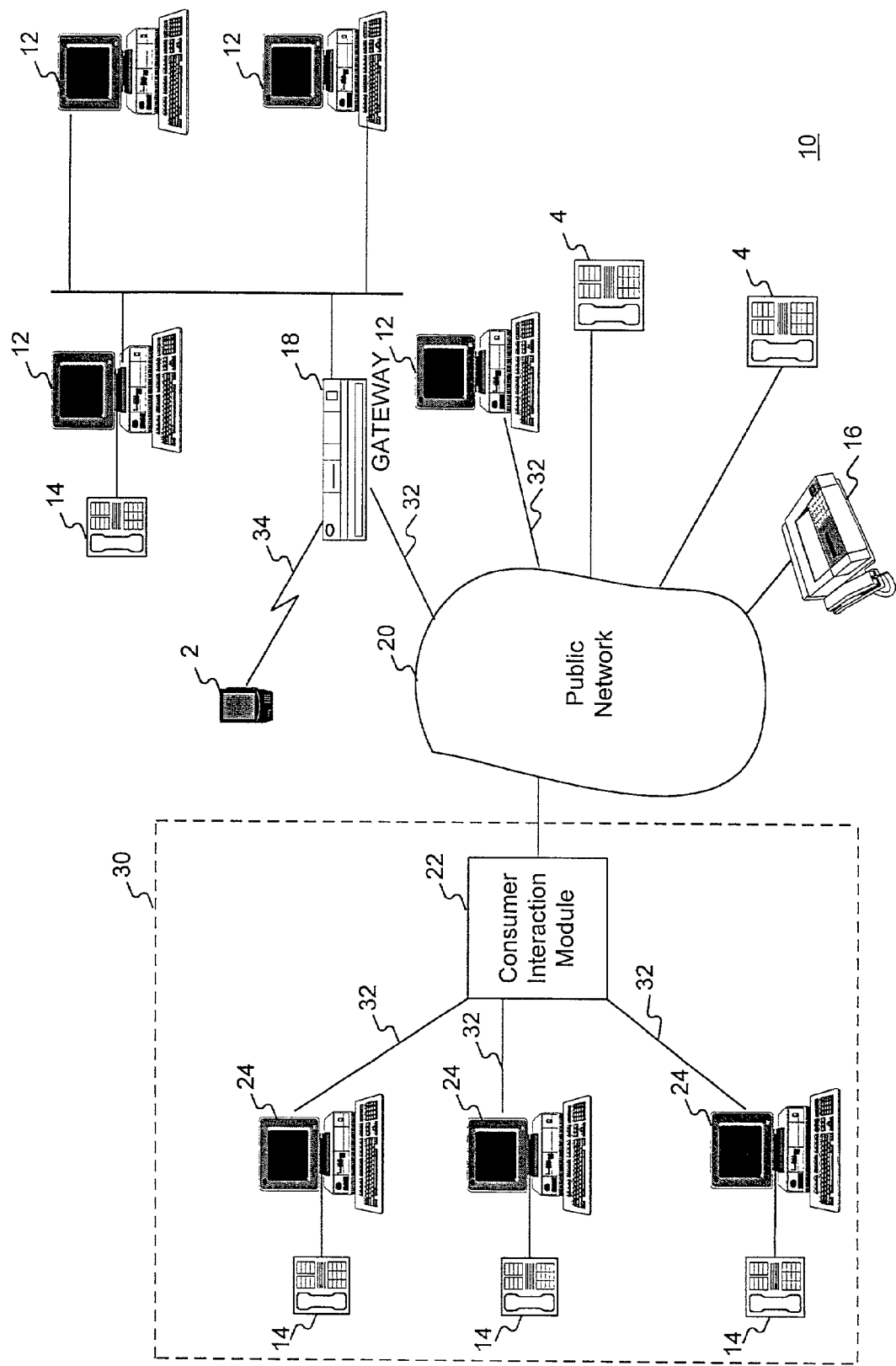
FIG. 1 is a block diagram of a network including an arrangement constructed in accordance with the subject invention for providing a multi-channel customer interaction center.

Referring now to the drawings, FIG. 1 illustrates a customer interaction system 10 in accordance with a preferred embodiment of the present invention. As shown in FIG. 1, customer interaction system 10 is comprised of thin client computing devices 2 (PDAs), desktop or laptop client computing devices 12, analog or digital telephones 4, voice over Internet protocol (VoIP) telephones 14, facsimile machines 16 and gateways 18 coupled to a public network 20. Each telephone 4 is a conventional analog or digital telephone that communicates with other analog and digital telephones over a public-switched telephone network (PSTN). VoIP telephone 14, on the other hand, acts as a protocol-agile communications device capable of interfacing with an attached computing device (12 or 24) for sending and receiving data to and receiving data from the public network 20. Gateway 18 is a file server that may be connected to other computers on the public network 20. Client computing devices 12 may be directly connected to public network 20, or they may be coupled to the public network 20 via gateway 18. As shown in FIG. 1, thin client computing devices 2 are coupled to gateway 18 via a wireless interface 34. Also, coupled to public network 20 is an eCIC 30. eCIC 30, as further shown in FIG. 1, is comprised of a plurality of CSR computing devices 24 and a consumer interaction module (CIM) 22. Coupled to each CSR computing device 24 is a VoIP telephone 14.

In a preferred embodiment of the system of the present invention, the public network 20 is the Internet. Thus, before describing the operation of the system of the present invention (described below in connection with FIG. 5), it would be helpful to briefly discuss the basic functionality of the Internet as it relates to the system of the present invention. The Internet is well known in the art as a worldwide data network of various computer systems and other data networks of varying size. Connection to the Internet may be accomplished via standard phone lines or via dedicated high-throughput communications lines such as Integrated Services Digital Network (ISDN) and T1. The functionality of the Internet as a data communication medium is well known and encompasses a broad range of applications. One such application is the World Wide Web (WWW). The WWW is a subset of the Internet which allows computers connected to the Internet to access interactive programs called Web sites located on other Internet-connected computers by entering a unique "address" associated with a particular Web site. Because of their interactive features, Web sites are ideal for both distributing and gathering information. Most importantly, a particular computer's Web site may be linked to and may control other programs stored on the same or on another computer connected to the Internet. For example, a Web site describing a company's products and services may be stored in a CIM 22 and accessed via the public network 20 (in this case, the Internet) by a customer using the client computing device (2 and 12).

The customer may view information about the company provided by the Web site, and may also use the Web site's interactive features to place a request for more information from the company or for technical support for the company's product. The Web site may then cause another program stored in the CIM 22 to automatically select an appropriate CSR to contact the customer in response to the customer's request. This, and other features of the Internet make it preferable as the public network 20 in accordance with the system of the present invention.

Figure 2:
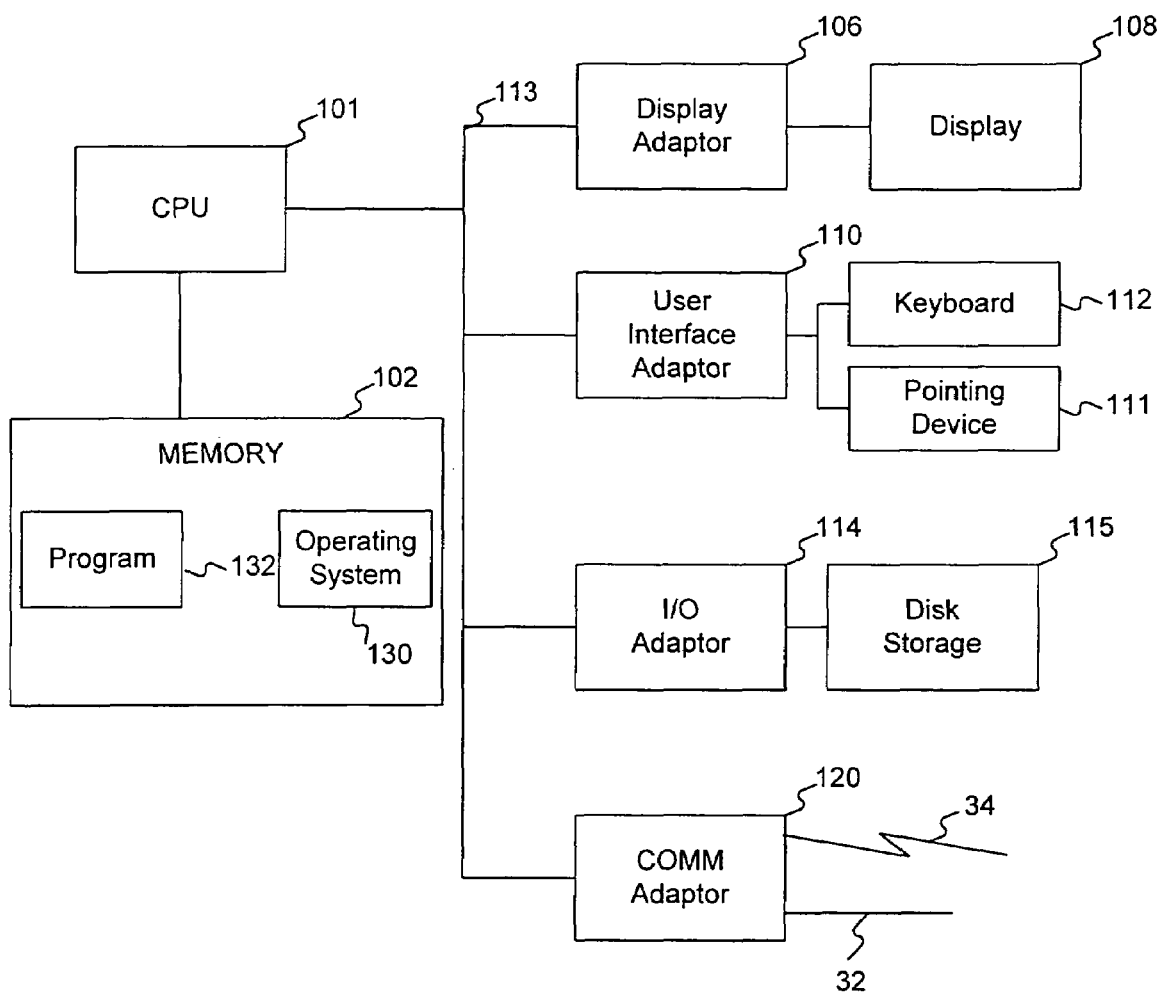
FIG. 2 is a block diagram of the major components of a client computing device.

As shown in FIG. 2, client computing device (2 and 12) is further comprised of a central processor unit (CPU) 101, a memory 102, a display adapter 106, a display 108, a user interface (UI) adapter 110, a pointing device 111, a keyboard 112, an input/output (IO) adapter 114, a disk storage unit 115, and a communications adapter 120. Client computing devices (2 and 12) enable a customer to access eCIC 30 via the public network 20 in order to request information about a company's products or services or receive assistance from the company's CSRs. Client computing device 12 is preferably connected to public network 20 via network interface cable 32 (e.g., a standard phone line or a high throughput telecommunication medium such as an ISDN line or a T1 line) for enabling bi-directional data communications with other computer systems connected to public network 20. Thin client computing device 2 is preferable connected to public network 20 via wireless data link 34 and gateway 18. Thin client computing devices 2, as is commonly known by those skilled in the art, usually consist of less capable processors and smaller memories than desktop and laptop clients. Memory 102 includes an operating system 130 for operating the device and a browser program 132 for rendering and displaying content. As shown, the various components of each client device (2 and 12) communicate through a system bus 113 or similar architecture. Client computing device 12 may additionally include a VoIP telephone 14 (shown in FIG. 1) or other device for capturing spoken information and transmitting it via the user interface adaptor 110 and communications adaptor 120 across public network 20. FIG. 2 also shows that communications adaptor 120 is coupled to network interface cable 32 (or wireless data link 34) for providing connectivity between client computer (2 and 12) and public network 20. There may be other components as well, but these are not shown to facilitate description of the unique aspects of this embodiment of the invention. The hardware arrangement of this computer, as well as the other computers discussed in this specification is intentionally shown as general, and is meant to represent a broad variety of architectures, which depend on the particular computing device used.

Figure 3:
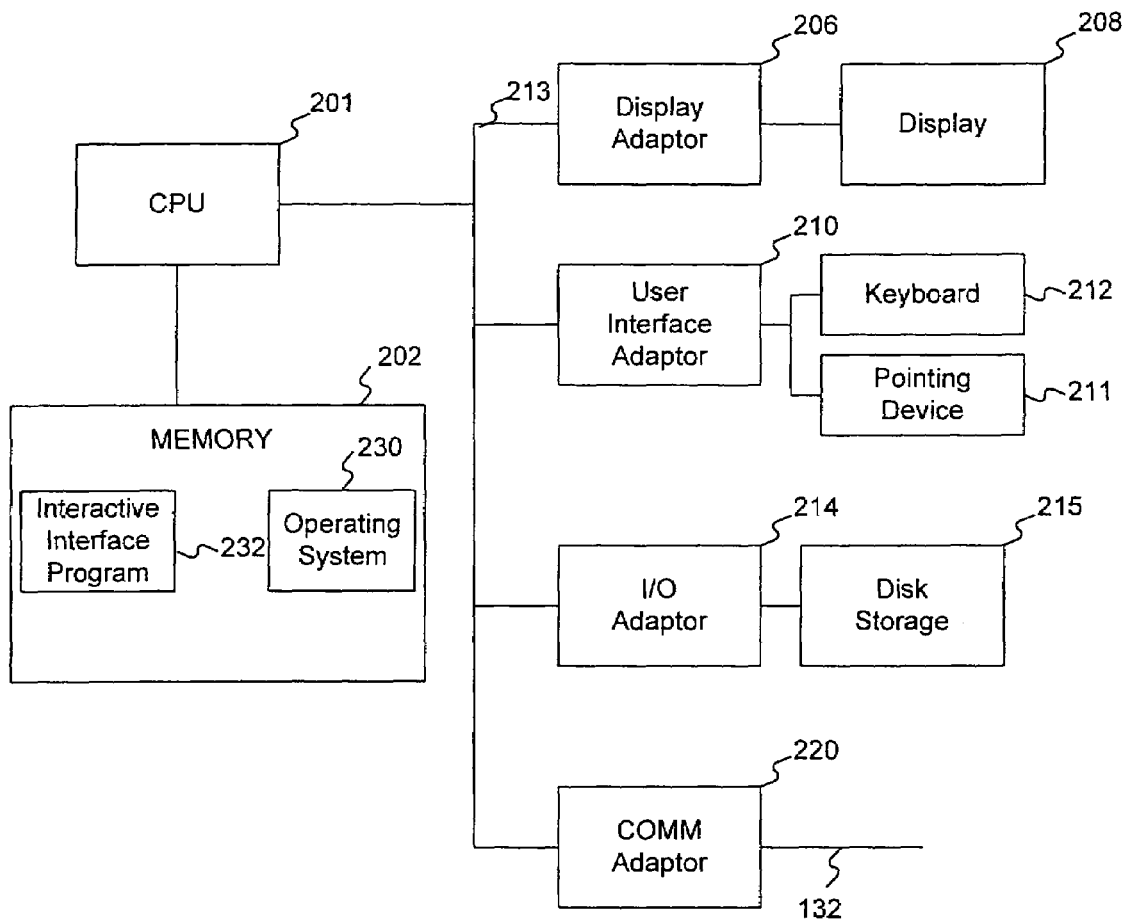
FIG. 3 is a block diagram of the major components of a CSR computing device.

FIG. 3 shows a detailed diagram of a CSR computing device 24 in accordance with a preferred embodiment of the present invention. As shown, CSR computing device 24 is comprised of a CPU 201, a display adapter 206, a display 208, a UI adapter 210, a pointing device 211, a keyboard 212, an IO adapter 214, a disk storage unit 215, a communications adapter 220 and a network interface cable 132. The CSR computing device 24 also has a memory 202 for storing an operating system 230 which controls its operation and for storing an interactive interface program 232 for rendering and displaying content. The CSR computing device 24 may also be a distributed computer system, such as a LAN, with the capabilities described above. As in the case of the client computing devices, the CSR computing device 24 is preferably connected to the public network 20 via a high throughput telecommunication medium, such as an ISDN line or T1 line for enabling bi-directional data communication with other computer systems also connected to the public network 20. A connection to the public network 20 via a high throughput telecommunication medium is particularly advantageous for the CSR computing device 24 because it provides sufficient bandwidth to handle a large number of accesses by other computer systems concurrently connected to the CSR computing device 24 via the CIM 22 and public network 20, such as the client computing device 12.

The operation of the system of the present invention is generally controlled by a control program stored in the eCIC 30, and executed by the CIM 22. This control program usually consists of multiple integrated program modules, with each module bearing responsibility for controlling one or more functions of the eCIC 30. In effect, each program module is a control program dedicated to a specific function or set of functions of the eCIC 30. As described above, in connection with the discussion of the Internet, the control program may be linked to an interactive Web site also stored in the CSR computing device memory 202.

Figure 4:
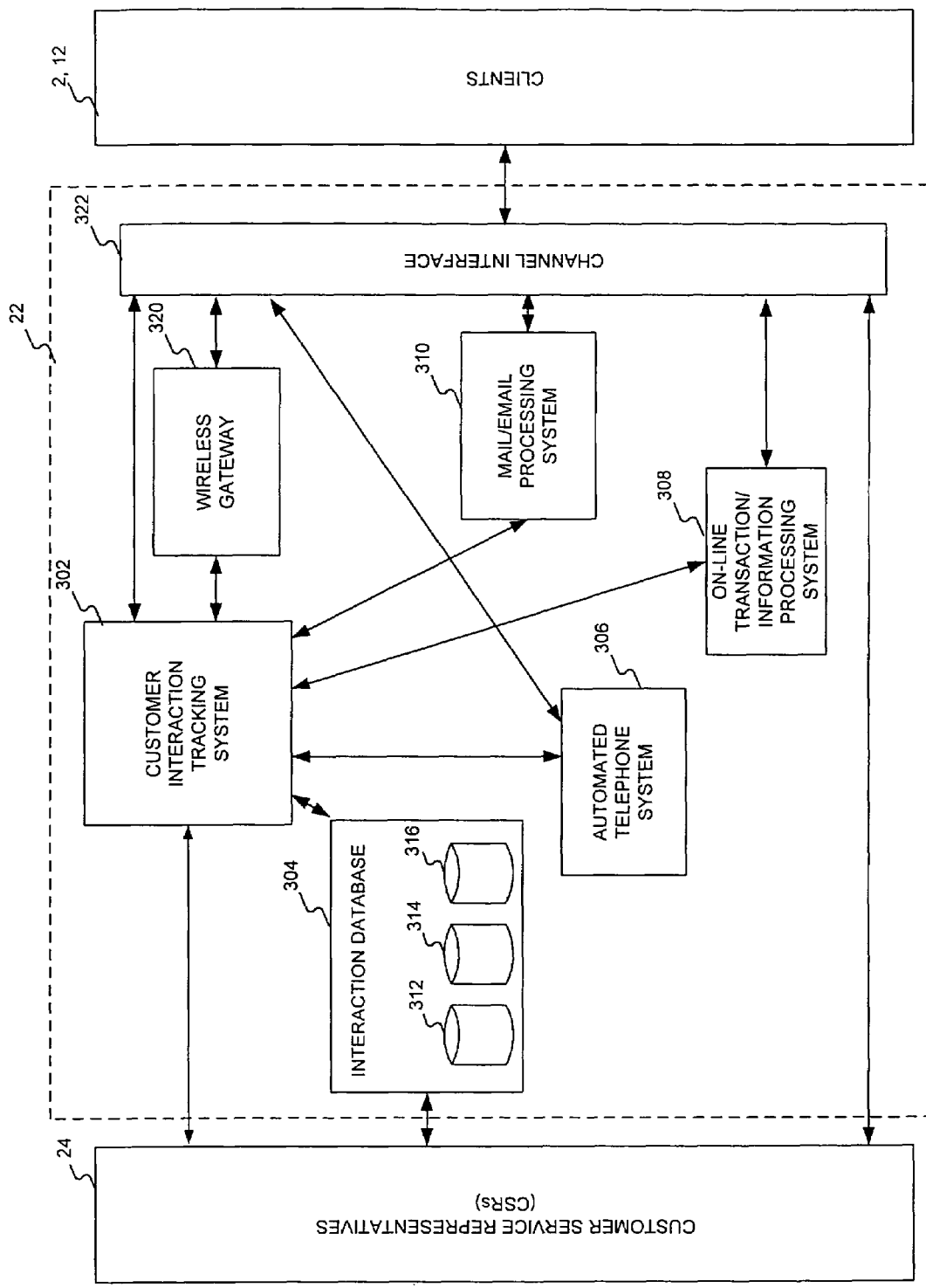
FIG. 4 is a block diagram of the major components of a consumer interaction module.

FIG. 4 specifically shows a detailed diagram of CIM 22 in accordance with a preferred embodiment of the present system. CIM 22 is comprised of a customer interaction tracking system 302, a interaction database 304, an automated telephone system 306, a transaction/information processing system 308, a mail processing system 310, a wireless gateway 320, and a channel interface 322.

Customer interaction tracking system 302 interfaces with the other CIM 22 components, CSRs 24 and clients (2 and 12) to provide organized access to interaction context information available in raw form from interaction database 304. Since a customer may be involved in a series of interactions that are all related, customer interaction tracking system 302 supports data access in which related transactions may be tied together rather than being simply organized as a set of independent interactions with or related to a particular customer. For example, the customer may initiate a business transaction in writing by mail. Later, the customer may call an automated telephone system 306 to check the status of the transaction and in the process of interacting with the automated system, need to be transferred to a live agent who in turn transfers the customer to another agent. At some later date, the transaction may finally be completed. Customer interaction tracking system 302 allows related data to be meaningfully associated in interaction database 304, thereby enriching the customer's information-gathering experience. Customer interaction tracking system 302 also performs the functions of an automated call distributor (ACD) that manages incoming Internet, telephone, and e-mail calls based on a set of parameters set by an administrator. The customer interaction tracking system 302 receives calls and intelligently and dynamically routes them to available CSRs. It also mixes Internet, telephone, and e-mail calls optimally for servicing by CSRs. Telephone calls from the PSTN or private branch exchange (PBX) are accepted through a telephony gateway server that can answer the call and place it on hold. Calls are processed by customer interaction tracking system 302 according to priorities established by various caller and call-related information.

Interaction databases 304 include tabular numeric and character string data, and can also include free text data, scanned images, and recorded voice from telephone interactions. The tabular data has specific semantic meaning associated with a particular field in a database, for example, a transaction date. Other data are unformatted such as free text of journal notes entered by a CSR during a telephone conversation. It is also common that interaction databases 304 do not share a common infrastructure. For example, a digital telephone call logging system may not share any infrastructure with a table-based transaction recording system. An interaction with the customer may capture information in one of several different contexts. For example, there may be basic customer information, such as account number, name, address, and telephone number. There may also be financial information including the status of various accounts. If a workflow system is being used to coordinate a sequence of interactions, the interaction has workflow information. There is also a category of information that can include the customer's past interactions with the eCIC 30. This information may include a history of phone calls, letters, faxes, in-person interactions, Internet messages and other communications; relationships to other events, such as a follow-up to a previous request; detailed transaction records, such as scanned letters and voice recordings; identities of previous points of contact; and preferred interaction style. Interaction databases 304 are further comprised of several specific databases including a profiling and preference database 312, a customer contact history database 314 and an customer interaction database 316. While this specification describes three specific databases that make up interaction databases 304, it is understood that any number of databases, containing any collection of information can be used without departing from the spirit and scope of this invention.

Profiling and preference database 312 contains a set of selection criteria pertaining to customer preferences. Examples of customer preferences include, but are not limited to, a customer's language skills, a preferred CSR and a customer's e-mail address. The CSR computing device 24 enables the customer to select one or more customer preferences from the profiling and preference database 312 for use by the CSR computing device 24 as selection criteria. For example, a customer who wishes to speak to a technical support CSR who has helped him previously may select that CSR as a customer preference. The client alternatively can be automatically referred to a CSR by the customer interaction tracking system 302 or another CSR. Customer contact history database 314 contains the contact history for a particular customer. More specifically, this database records the content of a particular customer interaction including the customer's response and mood. Customer interaction database 316 records the content of a current interaction with the customer and the customer response/mood.

Automated telephone system 306 permits a client to receive account information or to conduct simple transactions on the eCIC 30. For example, the user receives computer-generated voice queries from the system and responds by manual input using a telephone keypad or by voice if automated speech recognition is available.

Mail processing system 310 allows a client to interface with the eCIC 30 via written correspondence or facsimile 16. In operation, a client mails correspondence to eCIC30. The mail is routed to CIM 22 and then to mail processing system 310 where it is scanned in and routed to the appropriate CSR.

On-line transaction/information processing system 308 allows a client to interact with eCIC 30 via a data channel to the company's computers. The data channel may be a modem connection over a telephone channel from a terminal or computer at the client's location. The data channel may also couple a client application at the client's location to the company's computer system over the Internet. The client application may be a Web browser coupled to a Web server located in the eCIC 30. Each of these access routes to the eCIC 30 uses and updates interaction database 304.

Wireless gateway 320 allows a client using a wireless telephone, computer or other device to communicate with eCIC 30.

Finally, channel interface 322 routes client queries to the appropriate CIM 22 module, based on the client's communication device, client's priority and channel availability.

The operation of the present invention will now be described in connection with FIG. 5. The execution of this control program begins in step 40 when a customer connects to eCIC 30. As shown in FIG. 4, clients can interact with eCIC in a variety of ways. The client may interact with CIM 22 using telephone 14 (coupled to computer 12) and digital or analog telephone 4, in which case the channel interface 322 may route the call to automated telephone system 306 or to a CSR 24 via customer interaction tracking system 302. In the case of the automated telephone system 306, a computerized response system issues computer-generated voice queries/responses and the client responds via manual input using a telephone keypad or by voice if automated speech recognition is available. In the case of the customer interaction tracking system 302, a human CSR 24 personally provides information on products and services available through telephone 14. Another method of interacting with the eCIC 30 is through the mail or via facsimile machine 16. Written correspondence (mail or facsimile) is received in a mail processing system 310 and processed in accordance with the client's request. The client may interact with eCIC 30 (via channel interface 322) using the client computing device 12 via the public network 20 and the client may interact using a thin client computing device 2 via wireless gateway 320.

Figure 6:
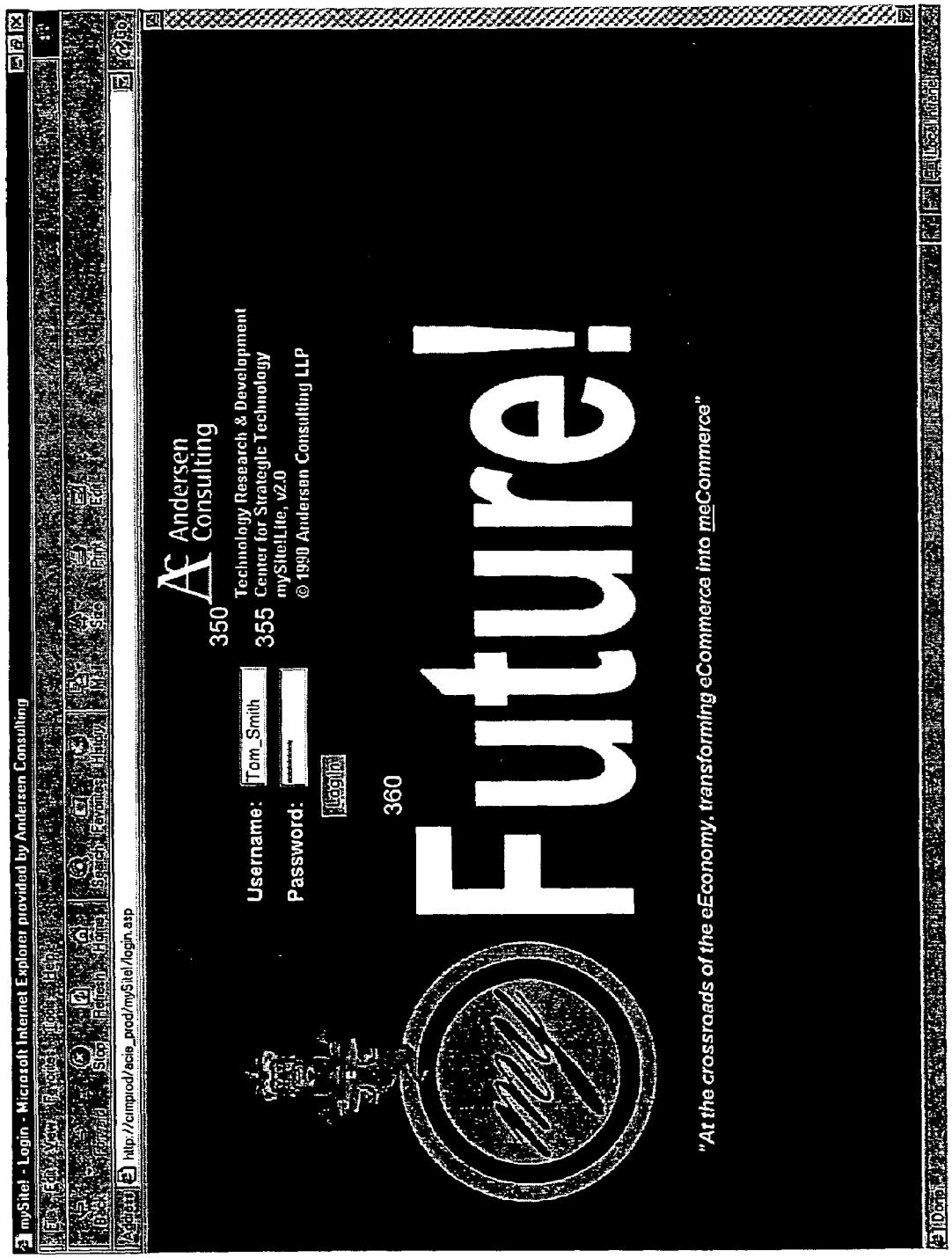
FIG. 6 is a depiction of a user access window for accessing the multi-channel customer interaction center.

When a client connects to eCIC 30 using the client computing device (2 and 12) or thin client computing device 2, a channel interface 322 routes the client's request to a transaction/information processing system 308 operating on CIM 22 prompts the customer in step 40 to initiate a request for contact. For example, this may be accomplished by routing the client computing device to a predetermined Web site, where the user is prompted to input whether the client is a registered user. If the client is not a registered user (step 42), processing flows to step 44 where the user is requested to provide preliminary information. Once the system receives and verifies the information, the client is provided with a valid username and password (step 46), and processing flows to step 48. If the client as determined in step 42, is a registered user, processing immediately flows to step 48 where the system displays a Web page similar to that shown in FIG. 6, prompting the user to input a username and password. The Web site shown in FIG. 6 is an example of a representative Web site and is not intended to limit the scope of the present invention. When thin client computing device 2 contacts CIM 22, it is imagined that the system will recognize the client as possessing lower memory and processing capabilities, and respond with lower resolution versions of the Web pages shown in FIGS. 6-22. It is understood that in some cases, particularly with respect to the video window 414 (discussed below), thin client computing device 2 may not support the functionality even with a lower resolution version of the shown Web pages. The Web site as shown is comprised of a username input field 350, a password input field 355 and a log in button 360. In step 50, CIM 22 determines whether the user has inputted a valid username and password. If the user has not inputted a valid username and password, the system prompts the user in step 52 to re-input the requested data. When the customer inputs a valid user name and password, processing flows to step 60. At step 60, the client initiates a request to contact a CSR.

Processing then flows to step 62 where the system determines the client's worth to the organization. In other words, the eCIC 30 evaluates the client's value based on previous activities, purchases, accounts, etc. If the customer's worth exceeds a threshold value, processing flows to step 64, the customer is presented with a full list of channels through which he/she may contact a CSR and processing flows to step 68. If the client's value does not exceed a threshold value, processing flows to step 66, the client is presented with a partial list of channels, and processing flows to step 68. It is envisioned that the partial list will be comprised of those channels that require less CSR interaction and provide a slower than real-time response to the client's inquiry. In step 68, the client selects the desired channel. Next, in step 70, the client interacts with the CSR over the selected channel, and in step 72, the client's inquiry is eventually resolved. Once the inquiry is resolved, processing flows to step 74 and the customer logs off the system.

In the event that the client initiates contact with the eCIC 30 via telephone 4 or 14, CIM 22 connects the client (via channel interface 322) to automated telephone system 306. As in the previous case, the customer is requested to input a username and password. Unlike the previous case, however, the information is inputted using the touch-tone keypad associated with telephone 14. Once the customer's ID is verified, the automated telephone system 306 then processes the customer's value to the organization and responds accordingly. If the customer's value does not exceed a threshold, his request is automatically resolved via the automated telephone system 306. Since there are really only two possible alternatives, there is no need to present the customer with a plurality of choices.

When the client initiates contact with eCIC 30 via a facsimile machine, email, or regular mail, processing proceeds with the channel interface 322 routing the call to mail processing system 310. Mail processing system 310 then evaluates the client's correspondence using optical character recognition (OCR), intelligent character recognition (ICR) technology, or conventional email routing software, and then causes the customer interaction system 302 to transmit the processed data to an appropriate CSR to provide a proper response to the customer via appropriate means (email, facsimile, regular mail, or telephone). The eCIC may also transmit an acknowledgment back to the sender as well as an expected time to reply. While this option necessitates interaction with a human CSR, it does not provide a real-time response and therefore does not necessitate an assessment of the customer's value to the organization.

Figure 7:
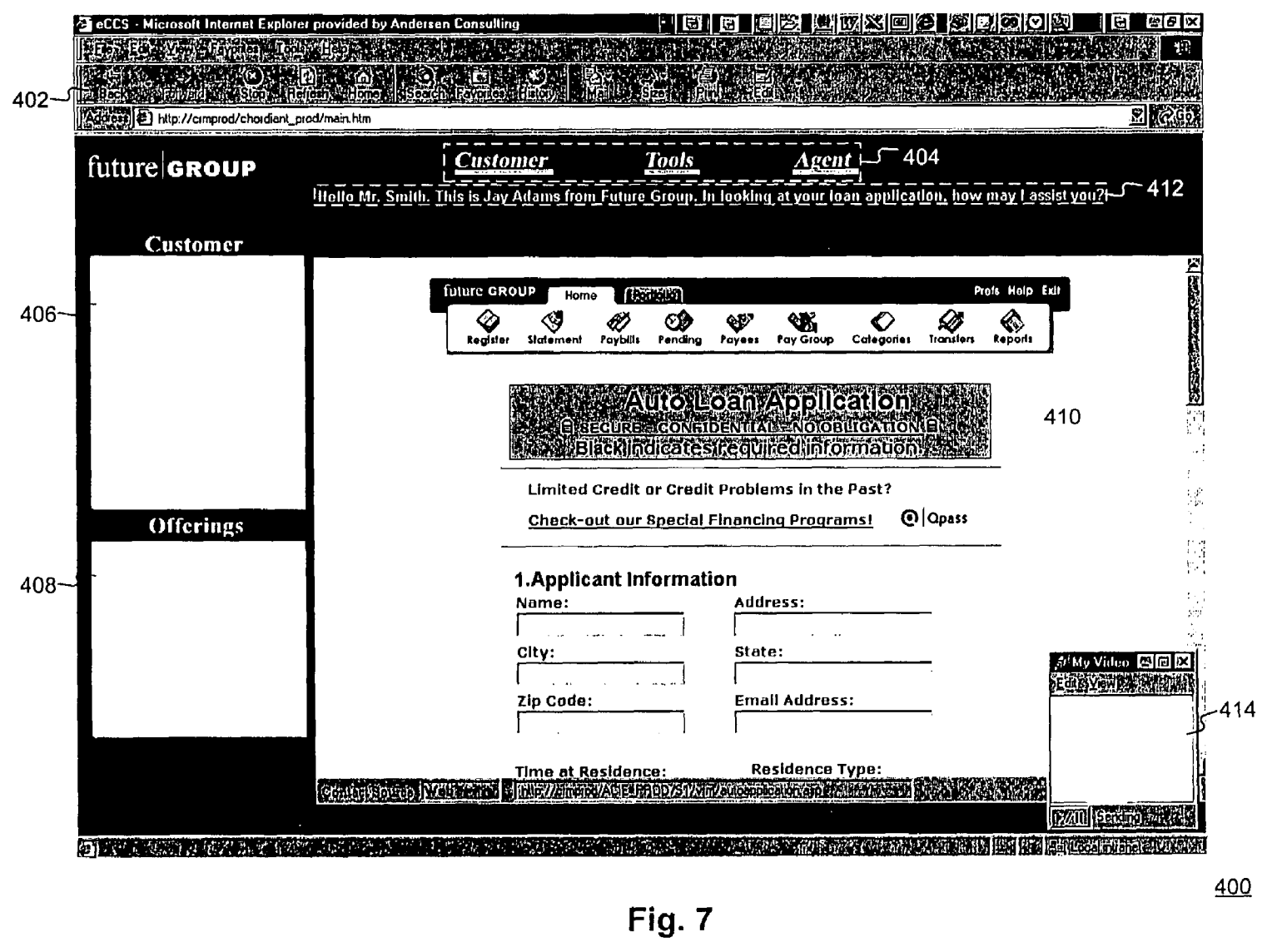

When a call is routed to a CSR computing device 24 from a client via the client computing device 12, telephone (4 or 14) or facsimile machine 16, a display screen similar to FIG. 7 is shown on the CSR computing device 24 screen. The depiction shown in window 400 is the preferred CSR interface window, but it should be recognized that the locations of the windows shown could be changed, and other CSR interface display layouts could be used without departing from the scope of the present invention. As shown in FIG. 7, window 400 includes a menu bar 402, a tool bar 404, a customer profile information window 406, an offerings window 408, a customer screen image 410, a suggested script field 412, and a video window 414. The menu bar 402 across the top of window 400 includes a set of standard menu options represented by various terms. The tool bar 404 includes a plurality of selectable function icons to perform predetermined functions upon selection of the corresponding icon. As shown, tool bar 404 includes customer-related options, tools and agent-related options. A pull-down menu associated with the Agent icon may allow the CSR to identify training classes (e.g., product information classes) of interest; review the screens the CSR has been using to interact other customers, etc. A pull-down menu associated with the customer icon may allow the CSR to review previous interactions that a particular customer has had with other CSRS. Finally, a pull-down menu associated with the Tools icon may allow the CSR to select messages to send to a customer, select pages to send to a customer, and push pages to a customer. The customer profile information window 406 is used to display customer profile information including the customer's address, account status and mood. The CSR specifies his or her impression of the customer's mood by selecting a mood level from a customer satisfaction scale (not shown). This window provides the CSR with valuable background information which may put the client's queries in better context. Offerings window 408 displays other company products and services that may be of interest to an on-line user given the user's current query. During a conversation with a client, a CSR would likely suggest various offerings to the client to enrich the client's on-line experience and to provide a greater degree of assistance. The customer's screen image 410 provides the CSR with the image of Web page(s) currently being accessed by the user. By observing the same screen as the client, the CSR can more easily respond to client inquiries. The text in the suggested script field 412 is intended to be contemporaneously read to the customer by the CSR during a customer interaction. This field is particular helpful to inexperienced CSRs who may need assistance in reacting quickly to unusual or unforeseen customer inquiries. Moreover, different messages may be displayed depending upon the experience level of the user, which is specified in the user preference window (explained below). This allows inexperienced users to receive a higher degree of assistance than would be required by an experienced user. Finally, video window 414 may be displayed to either provide the CSR with a video image of the on-line user or to show the CSR the image being displayed to the on-line user.

Figure 8:
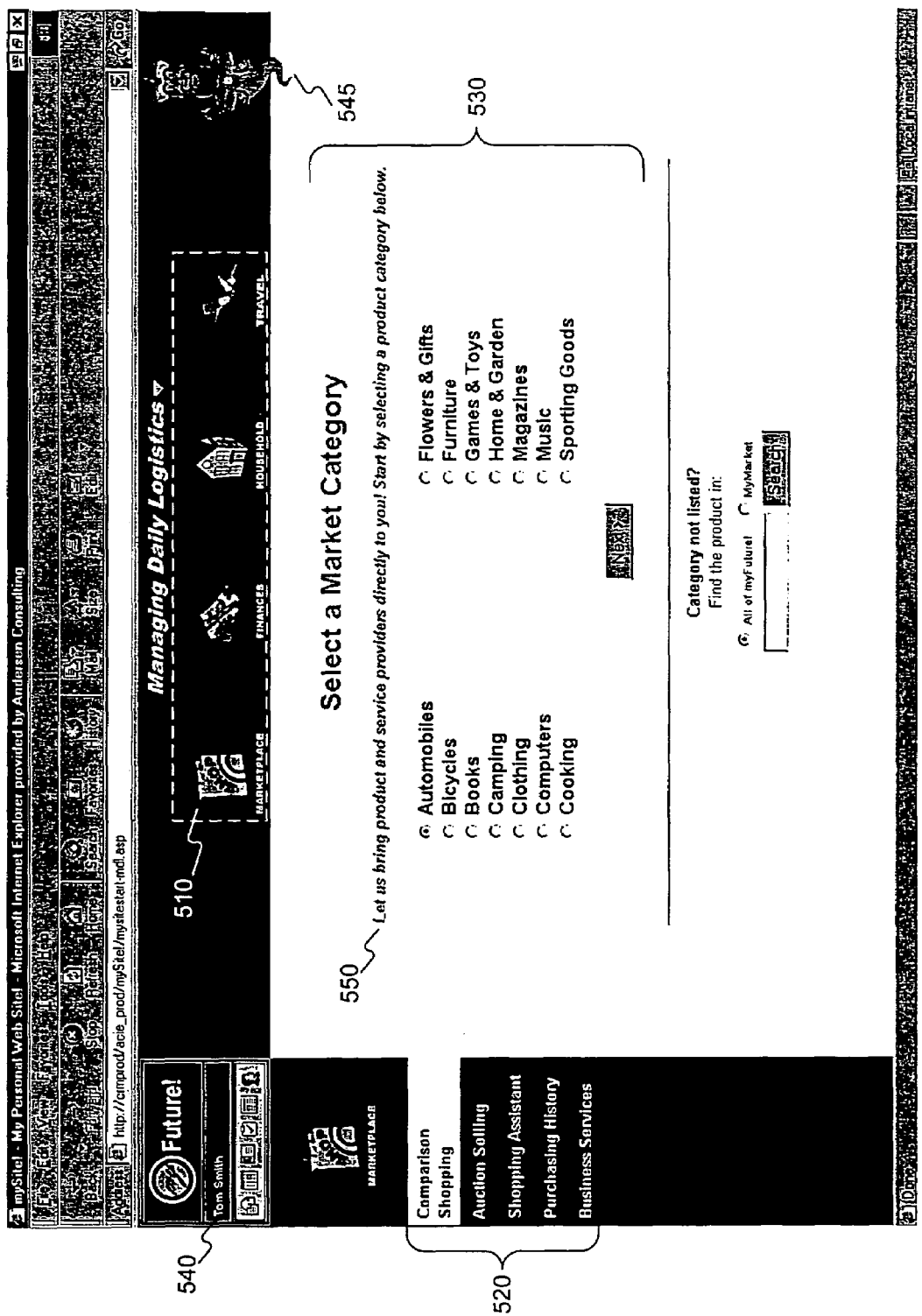
FIG. 8 is a depiction of a user input window, which allows the user to select a market category.

Operation of the present system will now be further explained in the context of a practical example. Once a user has gained access to the eCIC 30, he/she is presented with a user-interface access display 500 similar to that shown in FIG. 8. The user-interface access display 500, as shown in FIG. 8 is comprised of a plurality of user-selectable departments 510 and associated options 520. Each department 510 has a plurality of associated options 520 and each associated option has a plurality of associated input screens. The example of the user-interface access display 500 shown in FIG. 8 displays the five options associated with the "Marketplace" department (i.e., Comparison Shopping, Auction Selling, Shopping Assistant, Purchasing History, and Business Services) and the first screen associated with "Comparison Shopping" option (i.e., Market Category 530). Next to each Market Category 530 is shown a button which may be enabled or disabled using a mouse or other input device. The user-interface access display 500 also includes a user-preference button 540 labeled with the user's name (e.g., Tom Smith) and a Shopping Assistant 545 (explained below). Also shown on the user-interface access display is at least one user message 550 that is used to provide assistance to the user upon the occurrence of a predetermined event. Pressing button 540 opens the user preference window which allows the user to select a default display mode for the user-interface access display 500 and to further tailor the interface to provide him/her with a productive and rewarding interaction with a CSR. For example, the user prefer-ences window may provide an input for user experience level. This will dictate which user messages 550 the user will receive during a session. That is, the more experienced the user is, the less information he/she will be provided during a particular customer interaction.

Figure 9:
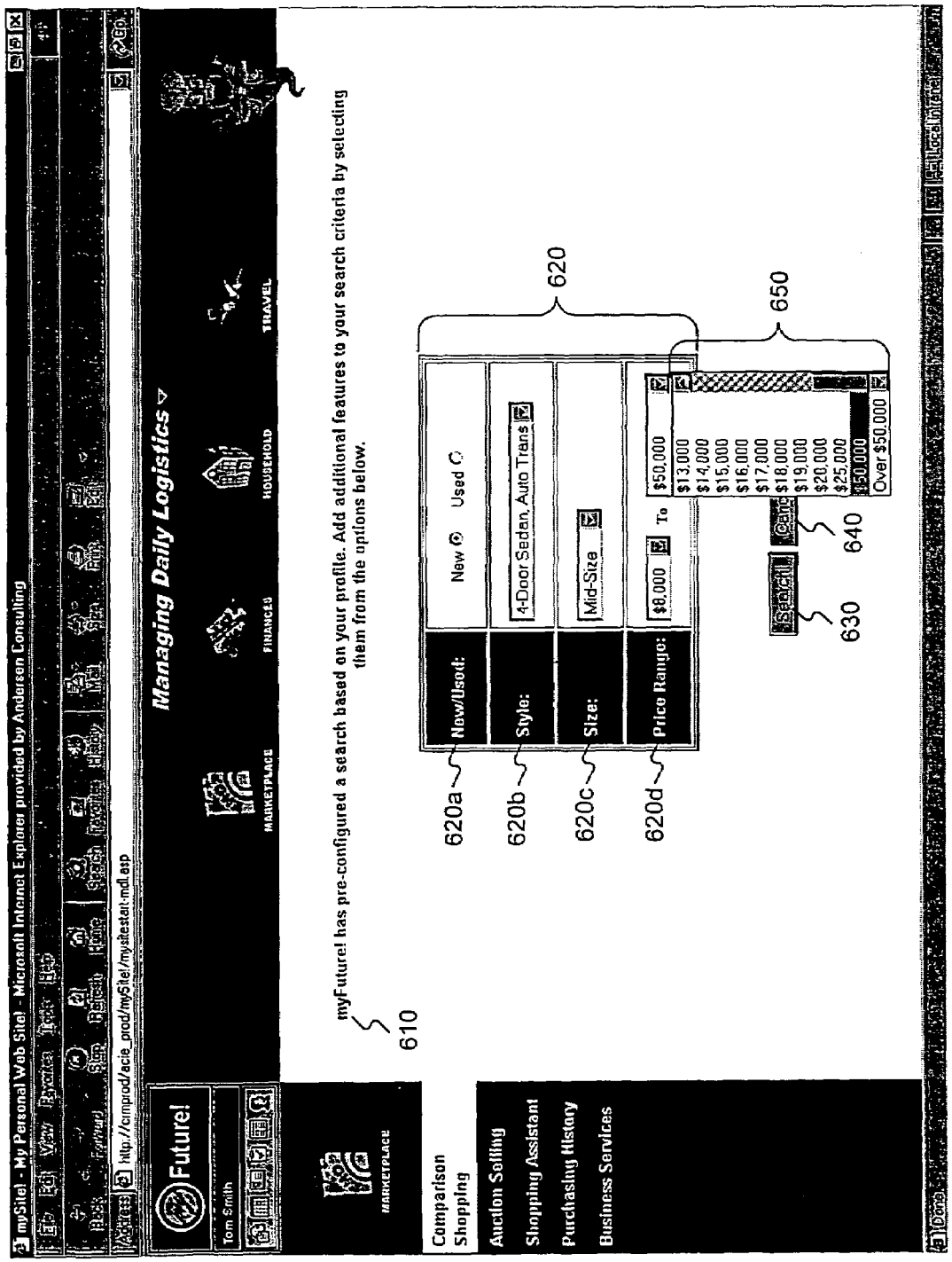
FIG. 9 is a depiction of a user input window, which allows the user to select a category of automobiles.

In the present example, the user would like to purchase a new car. Consequently, the user enables the button associated with "Automobiles" and the screen shown in FIG. 9 is then displayed on the client computing device screen 108. The screen displayed in FIG. 9 shows a user message 610 and a selection box 620 that further comprises a plurality of features 620a-d. Also shown in FIG. 9 is a Search button 630 a Cancel button 640 and a pull-down menu 650. The selection box 620 contains features 620a-d that may be associated with any retail item (e.g., New/Used, Style, Size and Price Range). Since the user's selection in FIG. 8 indicated his/her desire to purchase an automobile, eCIC 30 has populated the data fields with values normally associated with an automobile (e.g., 4-Door Sedan, Auto Transmission, Mid-Size, etc.) While this example shows four features 620a-d, it is understood that any number of features can be displayed without departing from the scope and intent of the present application. User message 610 informs the user that the eCIC 30 has pre-selected an automobile based on the user's previously inputted profile. It further informs the user that he/she may add additional features or change the existing features by activating one of the "down arrows". In the present instance, the user has chosen to modify the upper limit of feature 620d (Price Range) as shown by the pull-down menu 650.

Figure 10:
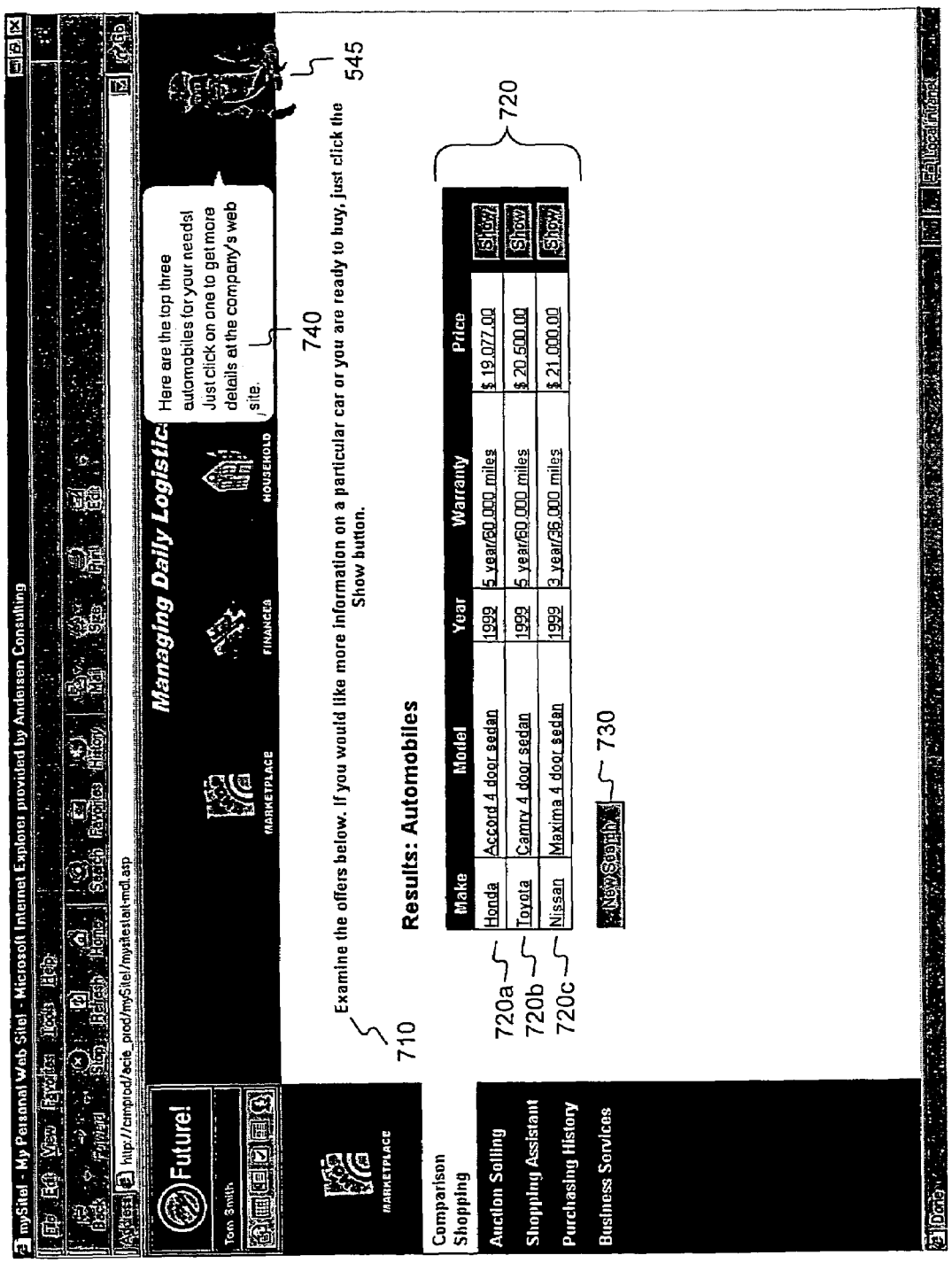
FIG. 10 is a depiction of a user input window, which allows the user to select a specific automobile.

Once the user is satisfied with the selections, he/she presses the Search button 630 and the screen shown in FIG. 10 is then displayed.

As in the case of FIG. 9, the screen shown in FIG. 10 is comprised of a user message 710 and a selection box 720 that is further comprised of a plurality of options 720a-c. Associated with each of the options 720a-c is a "Show" button which can be pressed to give the user more information about the particular option. Also shown in FIG. 10 is a New Search button 730 and an internal message 740. Like the user message 710, internal message 740 is displayed on client computing device 12 screen to assist the user in navigating the user interface. Unlike the user message 710, however, internal message is only shown when a user clicks on the Shopping Assistant 545. Clicking on the Shopping Assistant 545 gives the less-experienced user, more assistance into the appropriate user response to a particular screen. After reviewing the items contained in the selection box 720, the user can either select one of the available options 720a-c or he/she can request a new search by pressing the New Search button 730. If the user selects the "Show" button associated with option 720a, the screen shown in FIG. 11 will be displayed.

Figure 11:
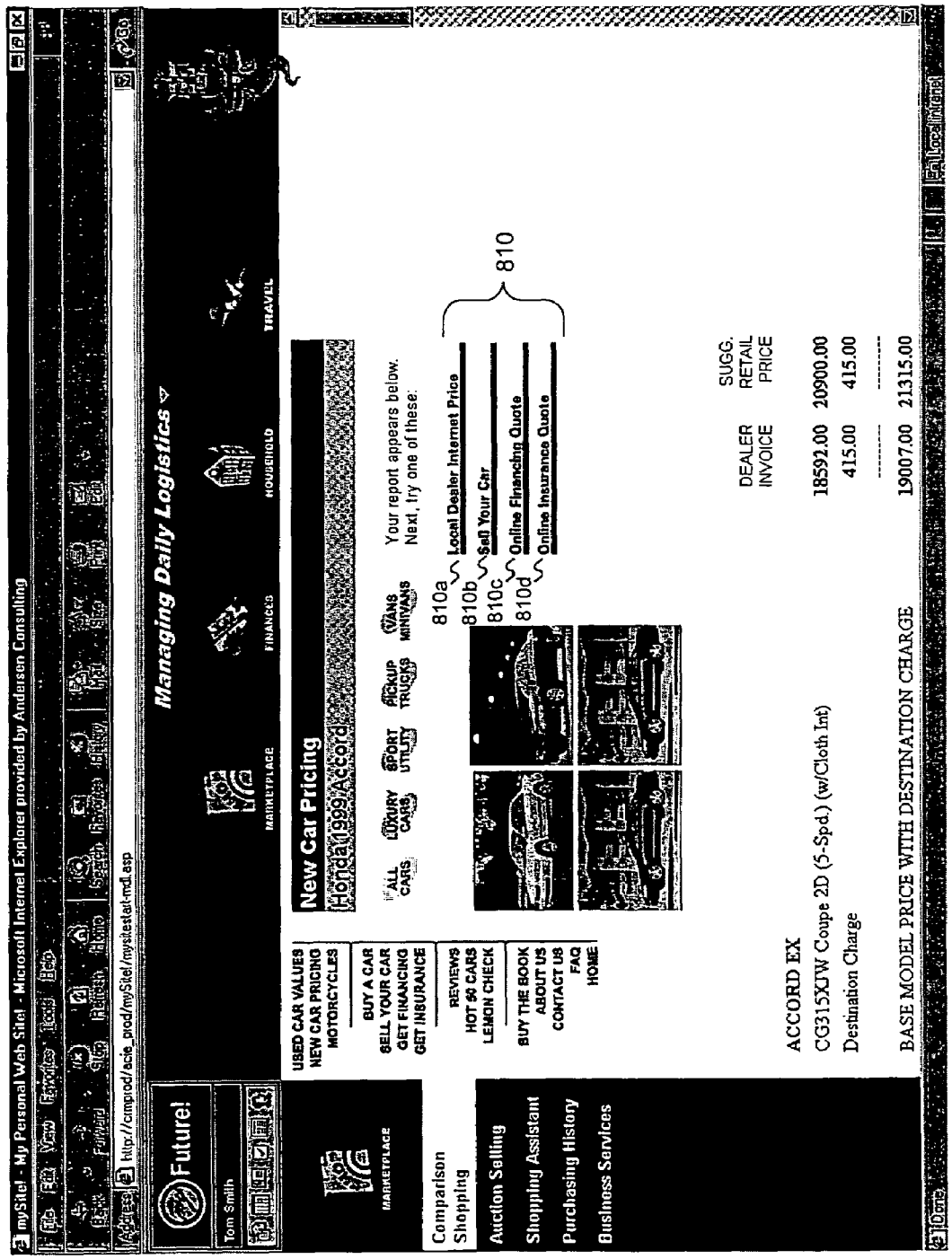
FIG. 11 is a depiction of a second user input window, which allows the user to select a specific automobile.

As shown in FIG. 11, all the details of the user's selected option are displayed, including the price and a picture of the car. A plurality of user-selectable options 810a-d are also displayed which give the user the capability to review prices offered by other dealers, sell his/her present car, pursue online financing, and pursue online insurance options. Assuming the user is ready to purchase the car, he/she selects option 810c "Online Financing Quote," which causes the screen displayed in FIG. 12 to appear.

Figure 12:
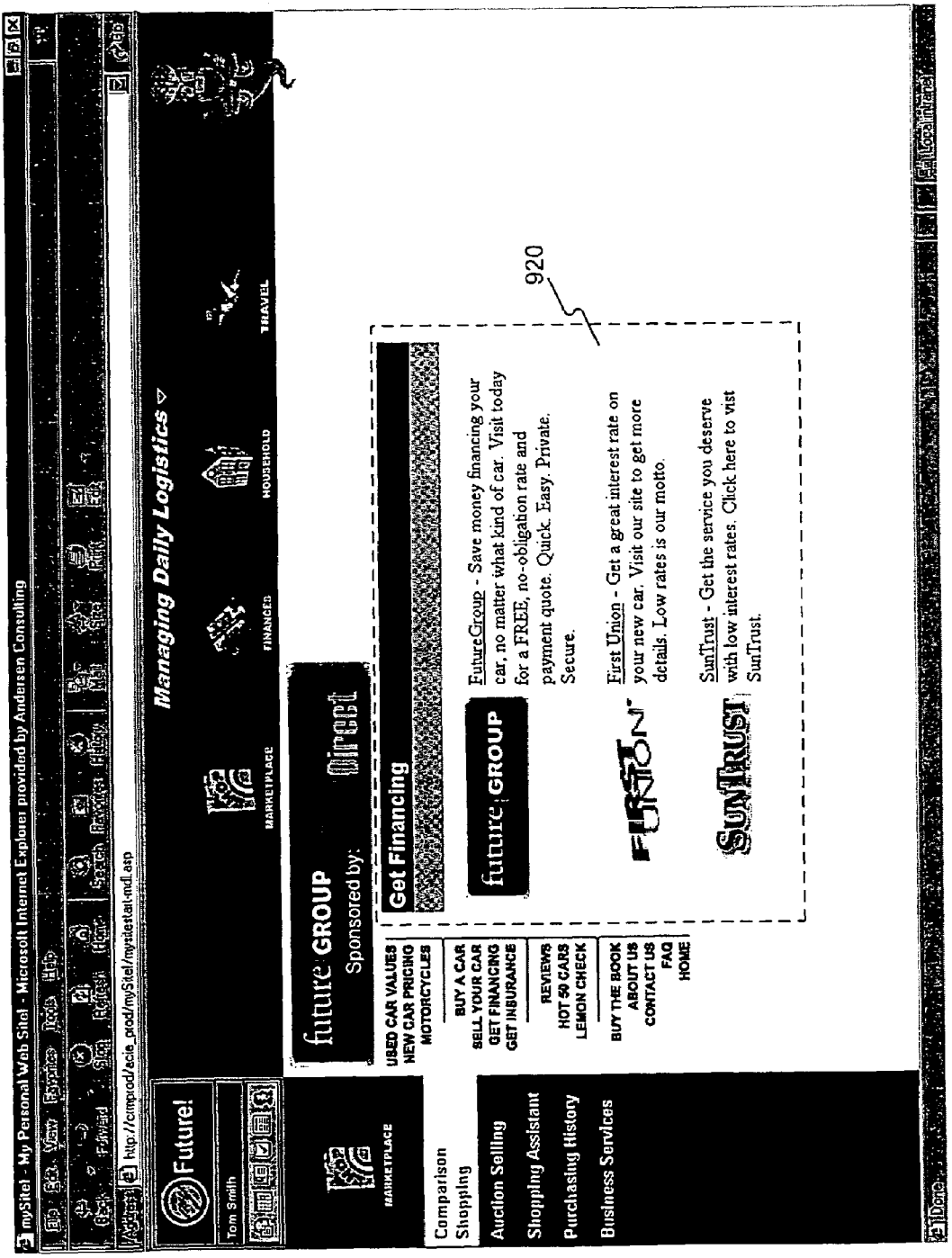
FIG. 12 is a depiction of a user input window, which allows the user to select financing.
Figure 13:
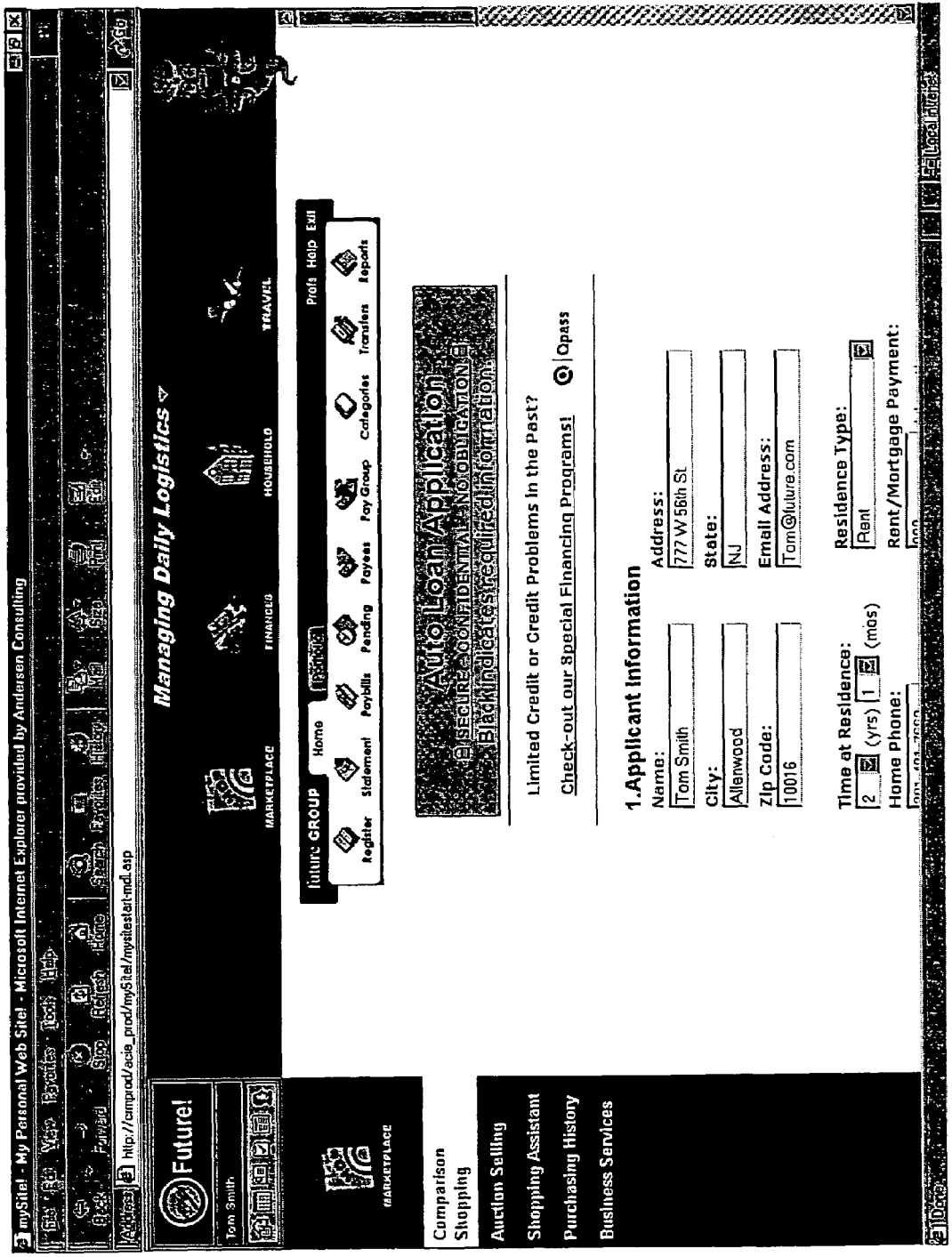
FIG. 13 is a depiction of a user input window, which allows the user to complete an on-line loan application.

The screen in FIG. 12 contains a selection box 920 comprised of a plurality of available financing options. After selecting a financing source, the user is then presented with a loan application (FIG. 13) to be filled out on-line and electronically transmitted to a financial institution for processing. The application as shown in FIG. 13 already includes personal information about the customer (prior to the customer filling in the form) because CIM 22 automatically extracts known information from interaction databases 304 and immediately populates the form with the retrieved information. Once the user has completed the application he/she is then presented with a screen similar to that found in FIG. 14.

Figure 14:
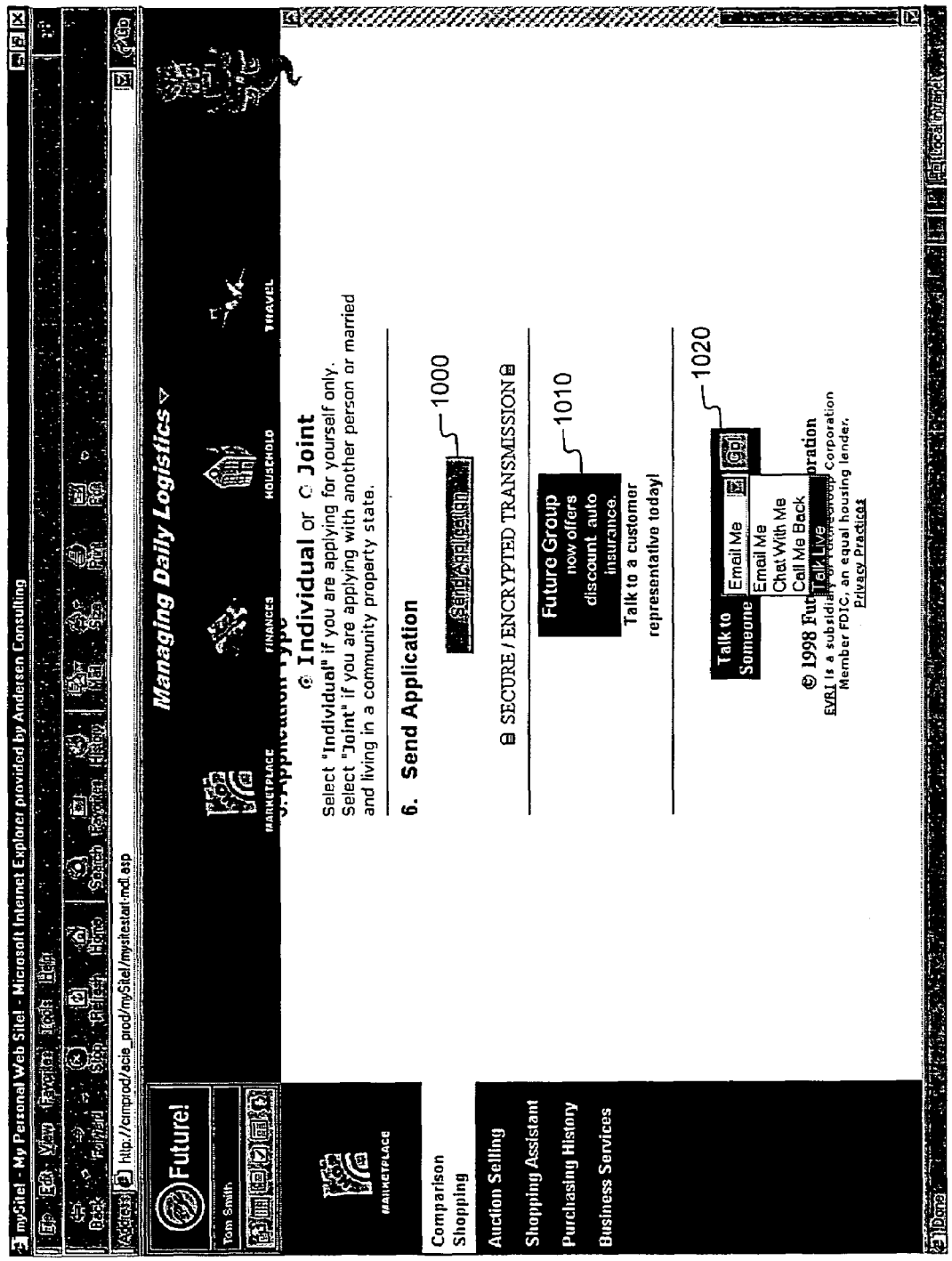
FIG. 14 is a depiction of a user input window, which allows the user to transmit a completed an on-line loan application to a CSR.

The screen in FIG. 14 contains button 1000, alert message 1010 and CSR interface button 1020. After completing the loan application, the user "presses" button 1000 and the application is sent to a lending institution for processing. FIG. 14 also shows that upon completing the loan application, the user may then be presented with an unsolicited offer related to the previous purchase. Alert message 1010 presents the user with an offer to purchase discount auto insurance and invites the user to talk further about the offer with a customer representative. The pull-down menu associated with CSR interface button 1020 shows that the user may talk to a CSR either via email, chat room, or telephone. The option of communicating via email, chat room, or telephone may be restricted by the eCIC 30 based on the customer's value to the organization, or it may be based on customer preference, system capabilities or all of the above. In this case, the user selects the "Talk Live" option, indicating that he/she would like to talk to a CSR via telephone 14. The eCIC 30 then places a call to a CSR via CIM 22. When the user places a call, eCIC 30 modifies the display on the client computing device 12 to resemble the screen shown in FIG. 15.

Figure 15:
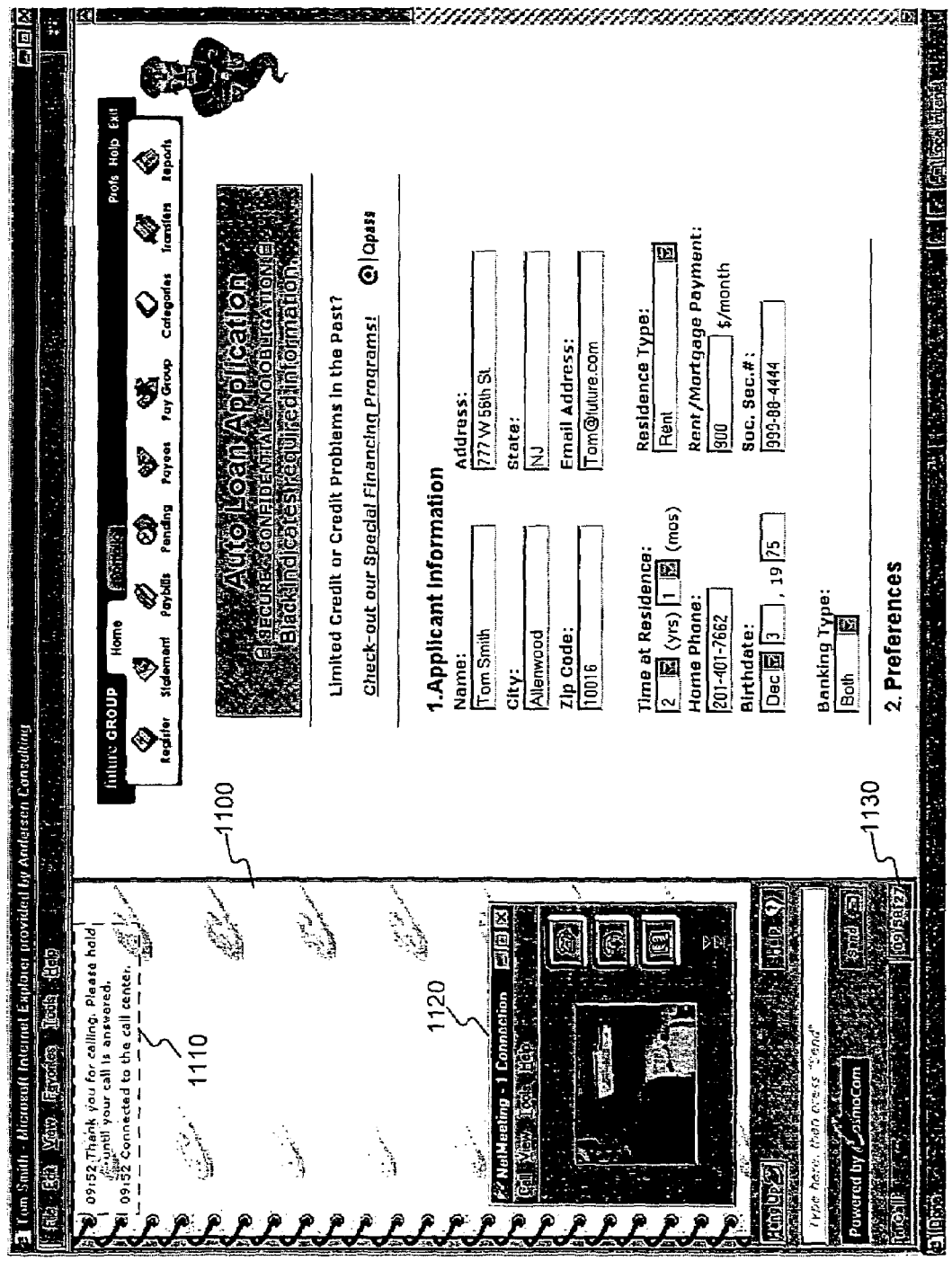
FIG. 15 is a depiction of a user input window, which shows the connection status of a telephone and video link with a CSR.

The display as shown in FIG. 15 includes the information inputted by the user on the right side of the screen with the connection information 1100 on the left side of the screen. As shown in FIG. 15, the connection information 1100 is comprised of a connection log 1110, a video window 1120 depicting an image of the assigned CSR and a call status indicator 1130. The connection log 1110 is a textual representation of the activities performed by eCIC 30 during the course of the telephonic discussion. As shown in connection log 1110, the call was initiated at 9:52 and immediately, it was connected to the call center. Video window 1120 shows a partial image of a CSR (presumably coming back to his desk) as the connection is established. Call status indicator 1130 shows that the system is up on a call with the current time.

Figure 16:
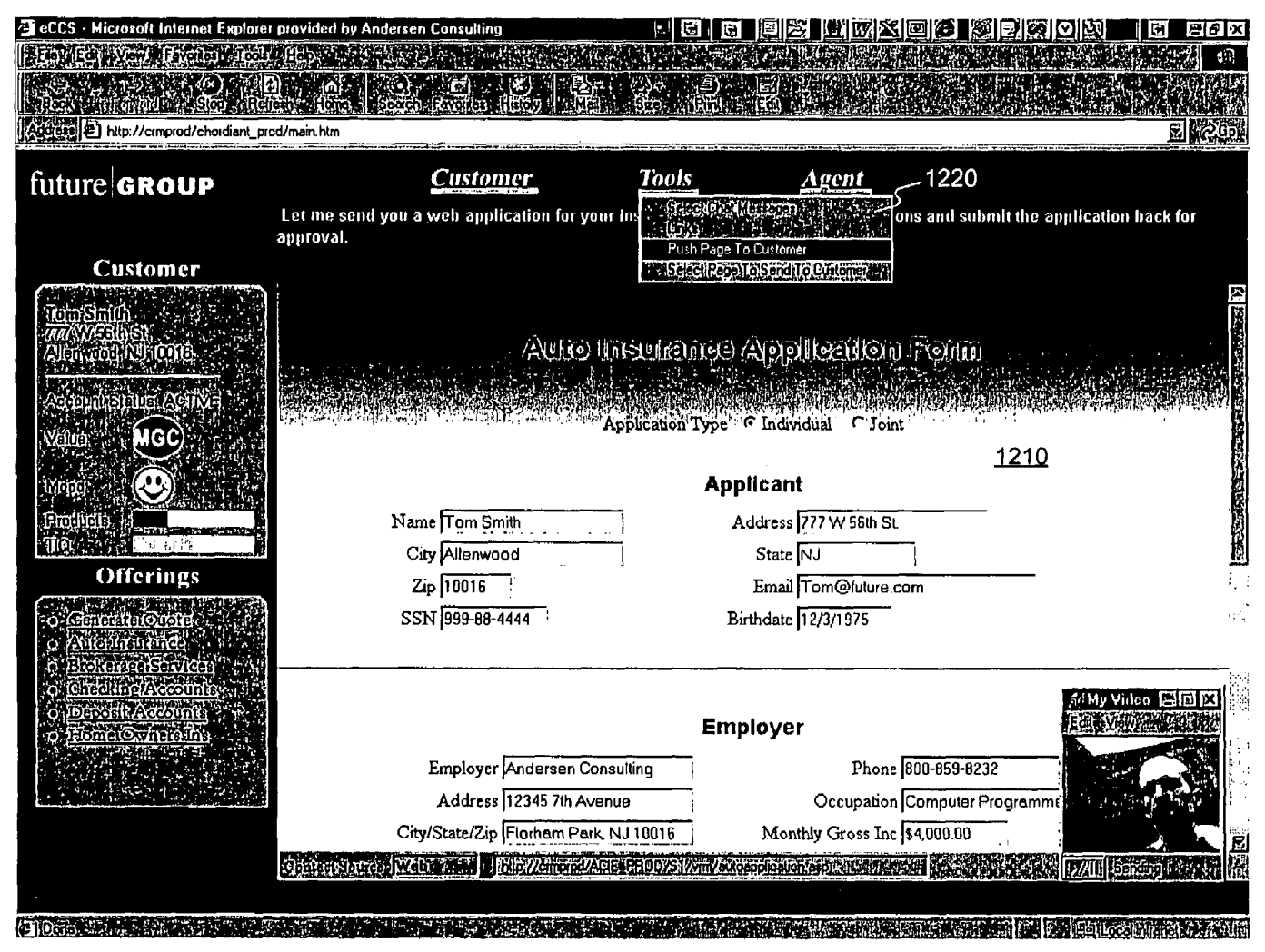

The display simultaneously shown on the CSR computing device 24 is shown in FIG. 7. In this example, the CSR is prompted by the suggested script field 412 to introduce himself and inquire as to the customer's specific questions. Shown in the customer profile information window 406 is the customer's address, account status, customer value, mood, a scale showing the number and type of products used by the client and a bar chart showing the customer's time in queue (TIQ). Offerings window 408 displays related products and services that may be helpful to the CSR and client, the customer's screen image 410 shows an exact duplicate of the screen currently displayed on the client computing device 12 and video window 414 provides the CSR with an image of the video being provided to the customer. Once the CSR introduces himself, he finds out that the customer is interested in purchasing automobile insurance. The CSR then retrieves the Auto Insurance Application Form 1210 as shown in FIG. 16, and utilizes a pull-down menu 1220 associated with the Tools bar 404 to transmit the form to the customer for his use. The retrieved form, as shown in FIG. 16, is automatically downloaded with information unique to the online customer, using information stored in interaction databases 304.

Figure 17:
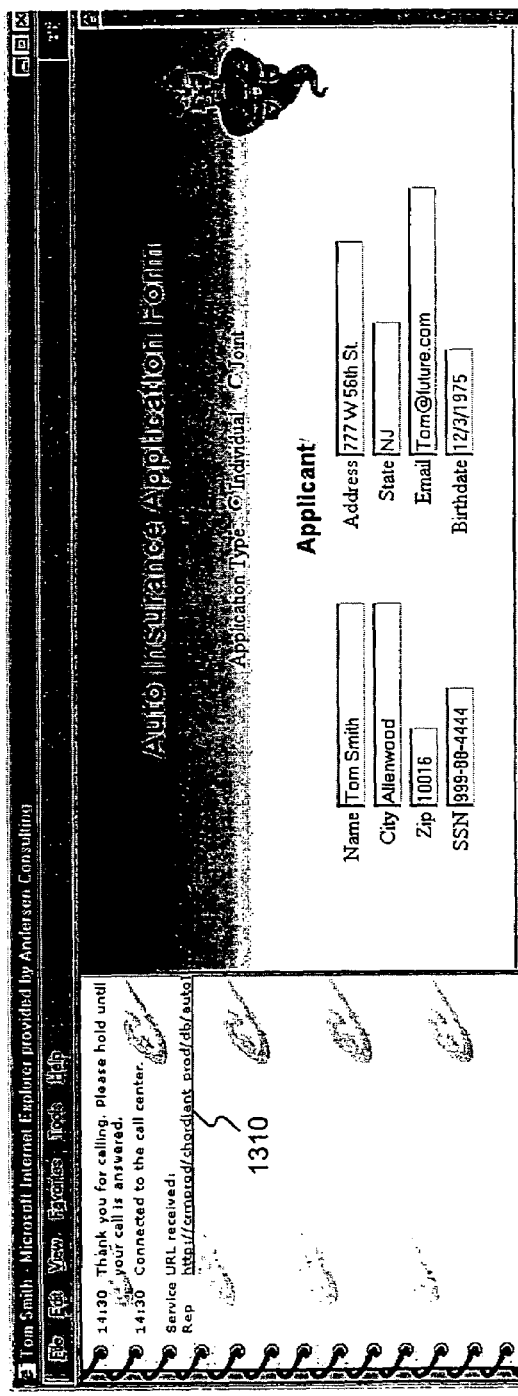
FIG. 17 is a depiction of a second user input window, which shows the connection status of a telephone and video link with a CSR.

The display 1300 depicted in FIG. 17 reflects the screen shown on the client computing device 12 after the CSR transmits the Auto Insurance Application Form 1210 to the customer. In addition to updating the user's display with the retrieved form, eCIC 30 also updates the connection log 1110 with the URL of the retrieved page 1310. When the customer is satisfied that the information in the form is correct, he/she transmits it back to the CSR for further processing.

Figure 18:
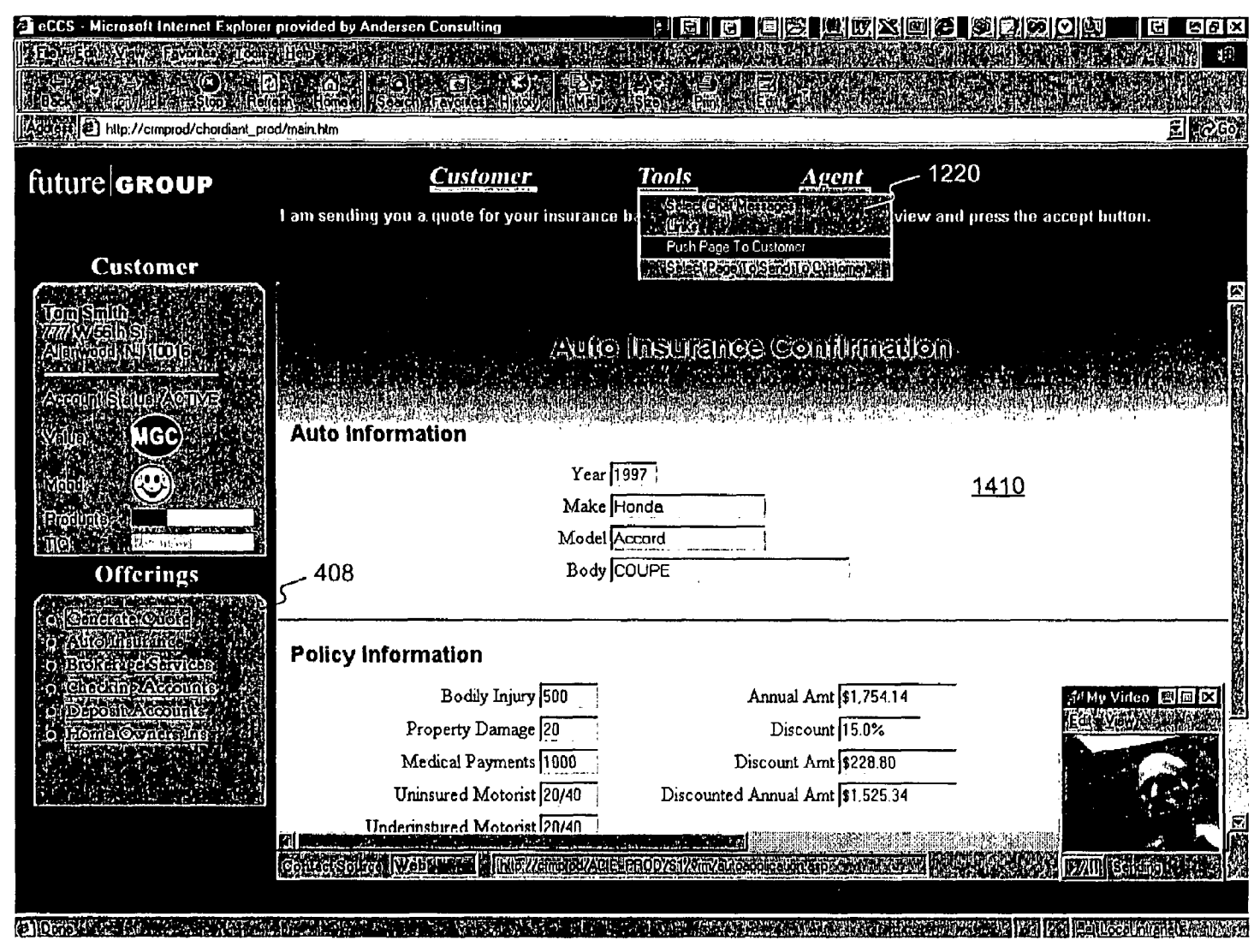

When the CSR receives the final version of the form, he/she accesses the offerings window 408 (as shown in FIG. 18) to generate a quote in light of the customer's personal information, driving record, etc. Once the eCIC 30 completes processing the request, the Auto Insurance Confirmation screen 1410 shown in FIG. 18 is displayed on the CSR computing device 24. The CSR then discusses the quote with the customer in addition to sending him a copy of the information using pull-down menu 1220.

Figure 19:
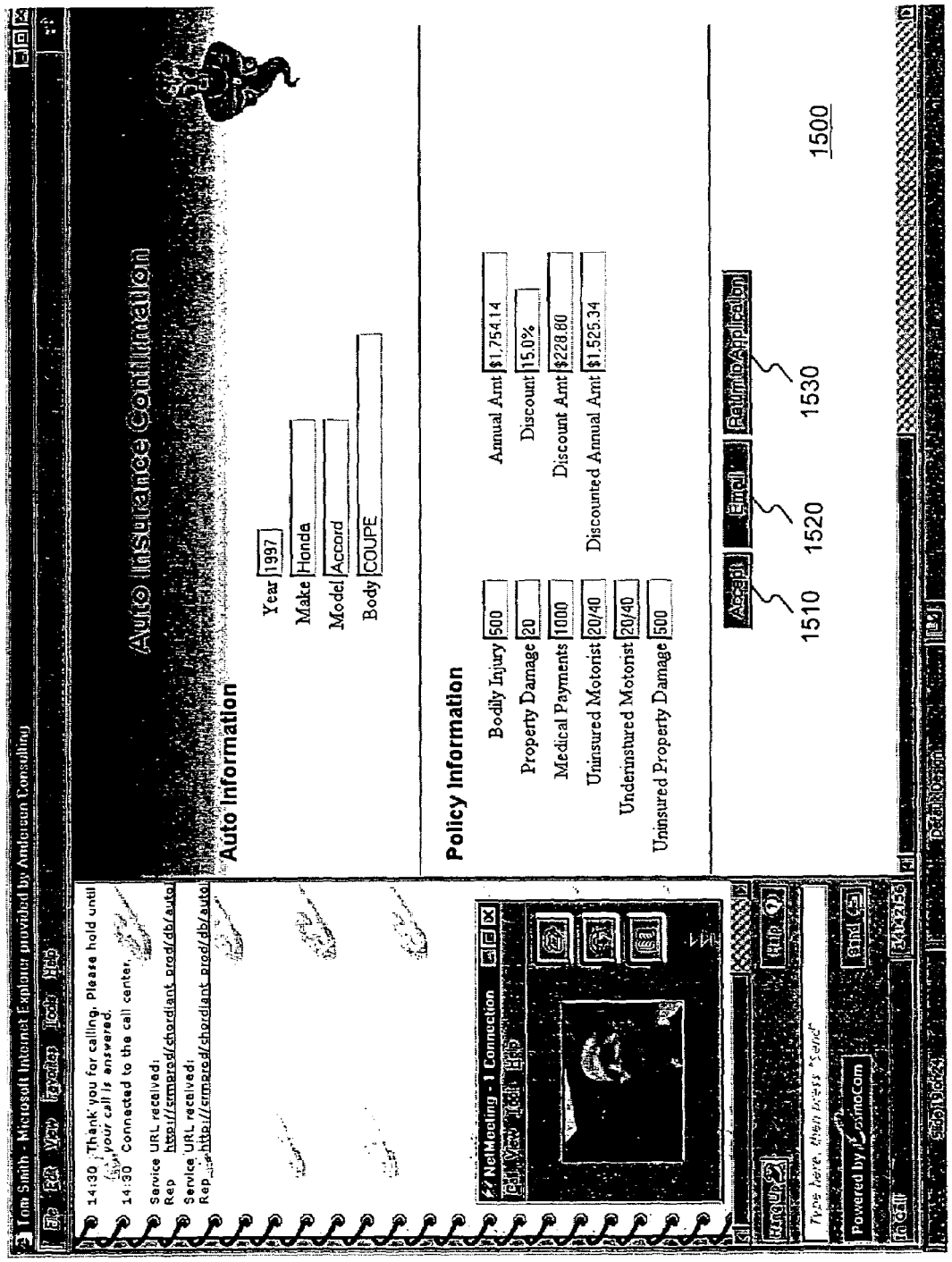
FIG. 19 is a depiction of a user input window, which accepts input from a user and shows the connection status of a telephone and video link with a CSR.
Figure 20:
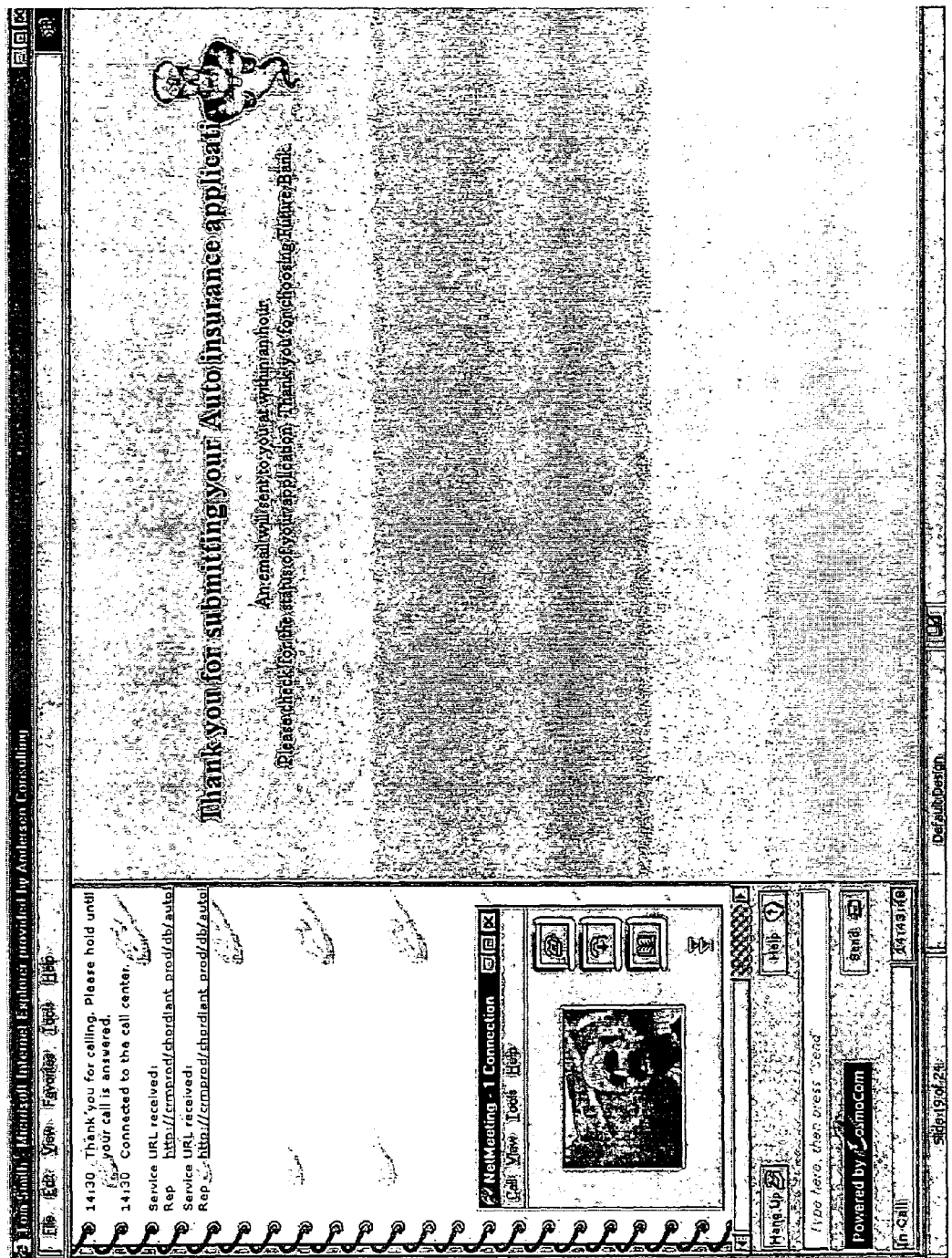
FIG. 20 is a depiction of a user input window, which shows the connection status of a telephone and video link with a CSR.
Figure 21:
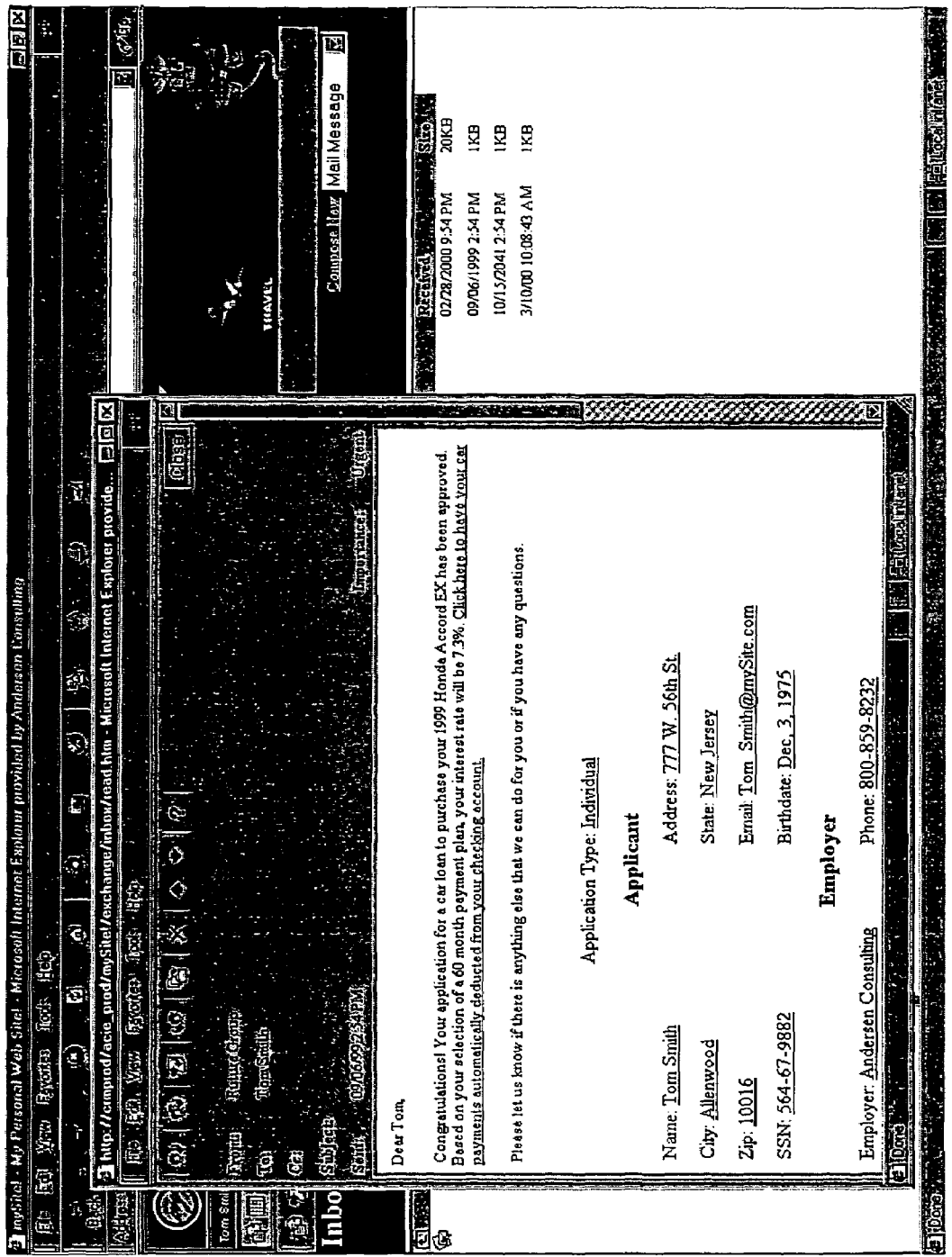
FIG. 21 is a depiction of a user screen, which shows an email message received by a user.

FIG. 19 depicts the screen 1500 displayed on the client computing device 12 upon receipt of the quote information from the CSR computing device 24. FIG. 19 further shows that in addition to displaying the form, client computing device 12 also displays a plurality of buttons 1510-1530, to facilitate further processing of the request. Specifically, the Accept button 1510 transmits the user's acceptance of the offer, the Email button 1520 creates a blank email message that will be delivered to the CSR once the desired message is drafted by the customer, and the Return to Application button 1530 returns the Auto Insurance Application Form 1210 to the client's screen. Once the user presses the Accept button 1510, he/she is presented with the display shown in FIG. 20 and logged off the system. When the user logs off the system, the CSR computing device 24 displays the fact that the call has been disconnected, and it displays the metrics associated with the last call. For example, the metrics might include total time spent servicing the customer, number of pages downloaded to the customer and the URLs of downloaded pages. It should be understood that any collection of metrics could be reported and delivered to the CSR, depending on the objectives and focus of the particular eCIC 30. The CSR computing device may also display personal messages (e.g., "Take your break in 2 minutes," or "Call your wife," etc.) to the CSR that have been received since the last customer interaction call began. Upon completion of the customer interaction call, the CSR computing device 24, will also evaluate the customer's profile and behavior to modify the interaction databases 304 so that when future customers with a similar profile log onto the system, the system will automatically consider them for automobile insurance without the customer otherwise requesting it. CSR computing device 24 also updates a historical record of the customer's mood as recorded by the CSR to aid subsequent CSRs in dealing with the customer.

At some time in the future, the user checks his email (FIG. 21) and is provided with a written approval for his car loan and a summary of his policy information.

It is important to note that while this specification has addressed the situation in which a customer purchases an automobile and insurance with the assistance of a CSR communicating over eCIC 30, the system may also perform additional functions. eCIC30 may additionally evaluate a customer's past purchases (credit card receipts, financed loans, etc.) and send customized offers for products and services that may appeal to the consumer as a result of the previous purchase. For example, if instead of buying a car the customer has recently taken a vacation to a ski resort, eCIC 30 will send alerts to the customer whenever discount ski vacations become available. Functionality would be built into the system to discontinue the offers once the customer has rejected three similar offers consecutively.

Figure 22:
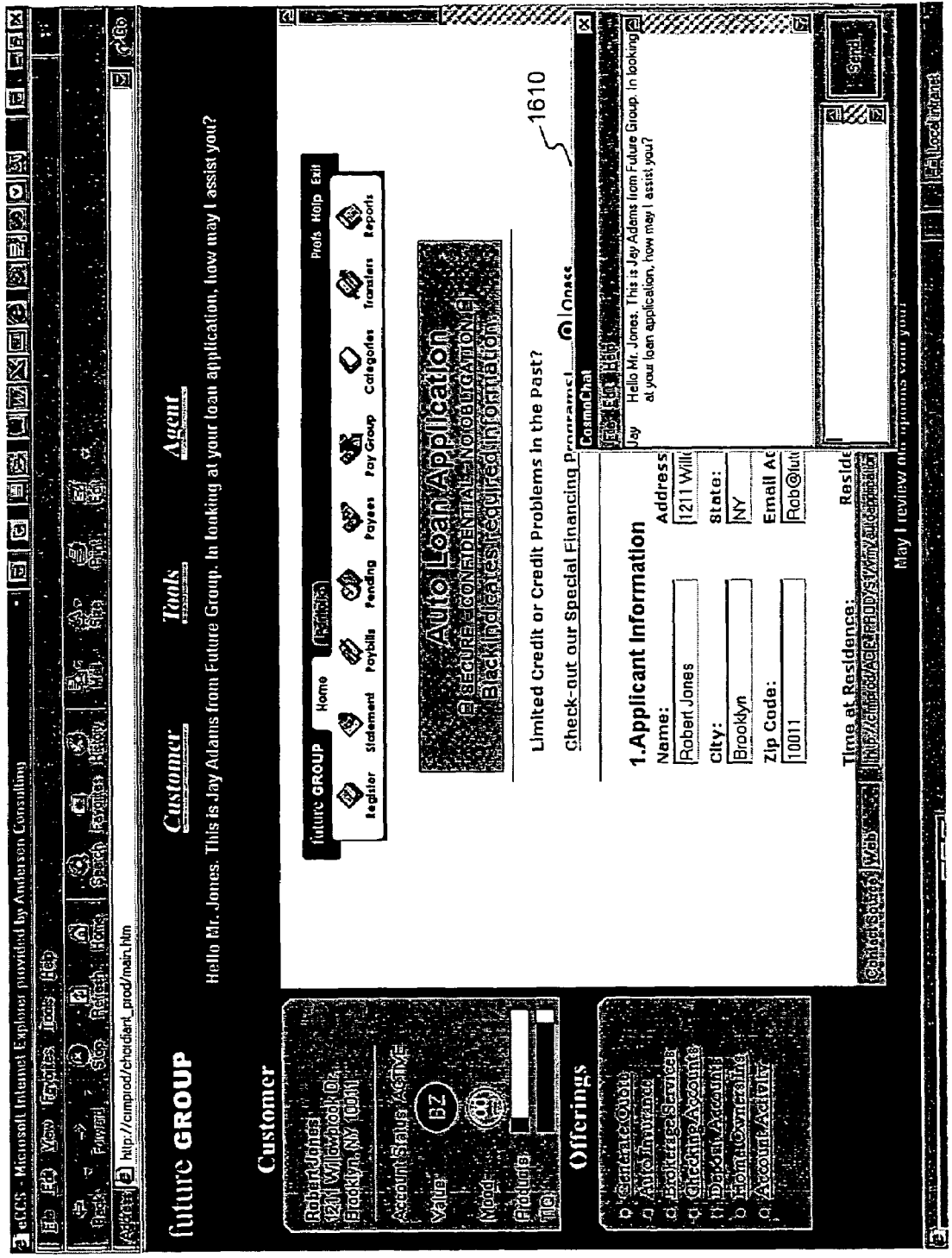
FIG. 22 is a depiction of a CSR interface screen which shows a chat window for interfacing with an on-line client.

While this specification describes the interaction between a CSR and a customer as occurring over the telephone, it is important to realize that as stated above, the discussion can also occur via email or chat room. As shown in FIG. 22, CSR computing device 12 may display a Chat Room Window 1610, through which the CSR can communicate with the user.

Also, customer interaction can be initiated by a CSR as well as by the customer. For example, a CSR may observe unusually high or low activity on a valued customer's credit card and call the customer to inquire as to the reason behind the abnormal situation.

From the foregoing description, it will be appreciated that the present invention provides an efficient system and method for the use of knowledge-based systems for performing event correlation and message notification in a computer system. The present invention has been described in relation to particular embodiments which are intended in all respects to be illustrative rather than restrictive. Those skilled in the art will appreciate that many different combinations of hardware will be suitable for practicing the present invention. Many commercially available substitutes, each having somewhat different cost and performance characteristics, exist for each of the components described above.

Figure 5:
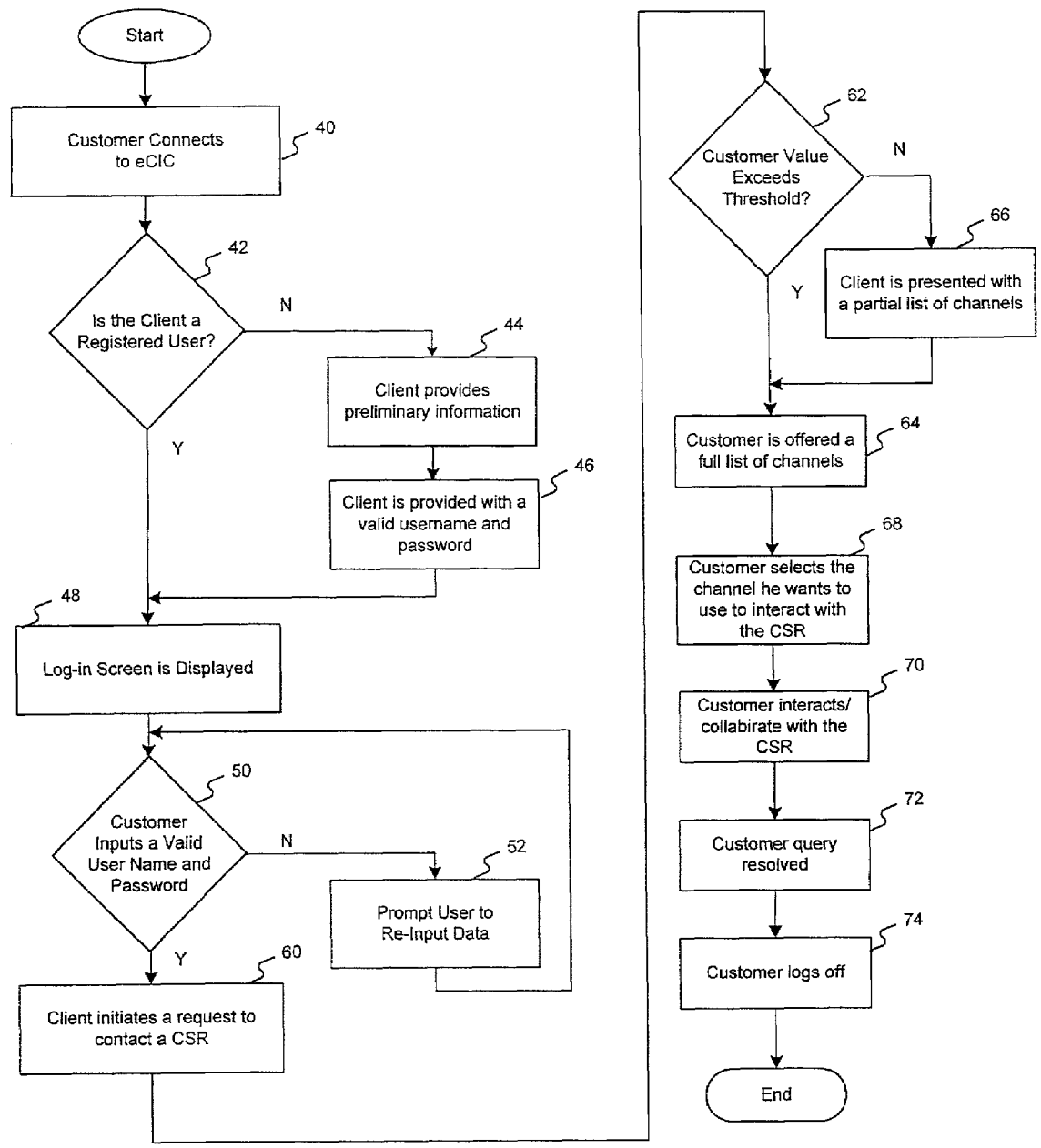
FIG. 5 is a flow diagram depicting the operation of the multi-channel customer interaction center in accordance with a preferred embodiment of the present invention.

The method of the present invention may conveniently be implemented in program modules that are based upon the flow chart in FIG. 5. No particular programming language has been indicated for carrying out the various procedures described above because it is considered that the operations, steps and procedures described above and illustrated in the accompanying drawings are sufficiently disclosed to permit one of ordinary skill in the art to practice the instant invention. Moreover, there are many computers and operating systems which may be used in practicing the instant invention and therefore no detailed computer program could be provided which would be applicable to these many different systems. Each user of a particular computer will be aware of the language and tools which are most useful for that user's needs and purposes.

Alternative embodiments will become apparent to those skilled in the art to which the present invention pertains without departing from its spirit and scope. Accordingly, the scope of the present invention is defined by the appended claims rather than the foregoing description.

The invention claimed is:

1. A method for interacting with a customer interaction center, comprising the steps of:
   determining a channel through which a customer interaction between a customer and the customer interaction center will be conducted, including identifying
      a telephone connection from the customer to an automated telephone system,
      a telephone voice connection between the customer and a human customer service representative,
      postal mail from the customer,
      electronic mail from the customer, and
      a facsimile connection between the customer and the customer interaction center,
      a client computing device connection from the customer to the customer interaction center through a public network, and
      a thin client connection device from the customer to the customer interaction center through a wireless interface;
   if the channel is one of postal mail, electronic mail or facsimile connection, transmitting an acknowledgement to the customer with an expected time to reply;
   if the channel is one of a telephone connection, a telephone voice connection, a client computing device and a thin client computing device,
   establishing a connection between the customer and the customer interaction center along the channel;
   automatically calculating a customer value for the customer based on historical customer interaction information contained in interaction databases including previous activities, purchases, or accounts of the customer recorded and stored on systems belonging to and backed up by the customer interaction center as transaction records for previous transactions between the customer and the customer interaction center over all possible channels, including reconciling the transaction records from different channels to produce the customer value;
   determining whether said customer value exceeds a predetermined customer value threshold, the customer value threshold defining the channels through which the current interaction may proceed so that lower valued customers have access only to channels requiring less interaction with a customer service representative of the customer interaction center and channels providing a slower than real-time response to queries from the customer; and
   if said customer value is less than said predetermined customer value threshold, presenting said customer with a partial list of interaction options over the computer network and receiving a selected interaction option from the customer over the computer network, wherein said selected interaction option is listed on said partial list;
   if said customer value is not less than said predetermined customer value threshold, presenting said customer with a complete list of interaction options over the computer network and receiving a selected interaction option from the customer over the computer network;
   conducting the interaction in accordance with the selected option;
   retrieving a contact history that corresponds to said customer from a contact history database;
   presenting the contact history to a customer service representative (CSR); and
   interacting with the customer in accordance with the contact history, wherein said contact history comprises information related to previous interactions with the customer;
   receiving a request from a client computing device;
   determining whether said request originates from a first client computing device comprising a first processor or from a second client computing device comprising a second processor, wherein said first client computing device comprises a slower central processing unit and a lower resolution display than said second client computing device; and
   responding to said request by adjusting and customizing the level of graphics and data sent to the client device to a format compatible with said first client computing device if said request originated from said first client computing device;

responding to said request by adjusting and customizing the level of graphics and data sent to the client device to a format compatible with said second client computing device if said request originated from said second client computing device.

2. The method of claim 1, wherein the step of interacting with the customer, further comprises the following steps:
   observing at least one customer response to a specific question;
   creating a customer profile based on said at least one customer response;
   recording said at least one customer response to a specific question in a customer interaction database record contained in the customer interaction database;
   repeating the observing, creating and recording steps until the completion of the interaction; and
   copying said customer interaction database record to said contact history database.

3. The method of claim 1, wherein the step of automatically calculating a customer value based on historical customer interaction information, further comprises the following steps:
   processing a customer request to purchase an item or service;
   retrieving historical customer interaction data associated with said customer from a customer value database;
   computing a customer value based on said customer request and the historical customer interaction data; and
   updating said customer value database.

4. The method of claim 1 wherein the interaction databases comprise: tabular numeric and character string data, and can also include free text data, scanned images, recorded voice from telephone interactions and other types and formats of data.

5. The method of claim 4 wherein the interaction databases comprise
   several specific databases that store and manage data including but not limited to: a profile and preference database containing a set of selection criteria pertaining to customer preferences, a customer contact database containing the contact history for a particular customer including the customer's response and mood, and a customer interaction database records the content of a current interaction with the customer and the customer response/mood.

6. A customer interaction system for an enterprise, the system comprising:
   a plurality of customer service representative (CSR) computing devices suitable for voice and data interaction between a CSR and a customer of the enterprise;
   a customer interaction module in communication with each CSR computing device, the customer interaction module comprising:
      an interaction database system storing
         data about customer profiles and preferences including previous activities, purchases and accounts of each customer,
         customer contact history data, and
         data about a current interaction with a customer;
      a transaction/information processing system under control of a control program for communicating data between the CSR and the customer, the control program configured to control the customer interaction system, including automatically calculating a customer value for the customer based the previous activities, purchases and accounts of each customer and on the data about a profile and preferences of the customer, the customer contact history data and data about a current interaction with the customer retrieved from the interaction database system stored on systems belonging to and backed up by the customer interaction center;
      if the customer value is less than a predetermined threshold, presenting the customer with a partial list of options for interaction with the CSR, and receiving a selected option from the customer, and
      if the selected interaction option comprises a client computing device connection from the customer to the customer interaction center through a public network, displaying to the CSR
         information from the interaction database system about the profile and preferences of the customer,
         information from the interaction database system about previous interactions the customer has had with other CSRs,
         an image of a Web page currently being accessed by the customer, and
         suggested scripts for delivery by the CSR;
      automatically conducting the interaction in accordance with the selected option;
      retrieving a contact history that corresponds to said customer from a contact history database;
      presenting the contact history to a customer service representative (CSR); and
      interacting with the customer in accordance with the contact history, wherein said contact
      history comprises information related to previous interactions with the customer;
      receiving a request from a client computing device;
         determining whether said request originates from a first client computing device
      comprising a first processor or from a second client computing device comprising a second processor, wherein said first client computing device comprises a slower central processing unit and a lower resolution display than said second client computing device; and
      responding to said request by adjusting and customizing the level of graphics and data sent to the client device to a format compatible with said first client computing device if said request originated from said first client computing device,
      responding to said request by adjusting and customizing the level of graphics and data sent to the client device to a format compatible with said second client computing device if said request originated from said second client computing device.

7. The customer interaction system of claim 6 wherein the control program is further configured to control the customer interaction system for pre-configuring and customizing information for display to the customer on a client computing device of the customer based on the data about the customer's profiles and preferences, the customer's contact history data, and data about the current interaction with the customer from the interaction database system.

8. The customer interaction system of claim 7 wherein the control program is further configured to control the customer interaction system for pre-configuring and customizing the information for display based on a received request for product or service information from the customer.

9. The customer interaction system of claim 8 wherein the control program is further configured to control the customer interaction system for providing customized information about related products and services based on the data about the customer's profiles and preferences, the customer's contact history data, and data about the current interaction with the customer from the interaction database system.

10. The customer interaction system of claim 8 wherein the control program is further configured to control the customer interaction system for storing in the interaction database system information about the request received from the customer and information about the pre-configured information provided to the customer.

11. The customer interaction system of claim 6 further comprising:
 an automated telephone system responsive to keypad data and voice information originating with a customer through telephone interaction with the customer interaction system; and
 a mail processing system to process written postal and electronic mail and facsimile interactions from a customer through written correspondence with the customer interaction system.

12. A method for interaction between a customer and a customer interaction center, the method comprising the steps of:
 recording transaction records on systems belonging to and backed up by the customer interaction center for transactions between a customer and an entity served by the customer interaction center over all interaction channels;
 automatically calculating a customer value for the customer based on historical customer interaction information contained in interaction databases including the recorded transaction records, including reconciling the transaction records from different channels to produce the customer value;
 comparing the customer value with a predetermined customer value threshold, the customer value threshold defining the channels through which the current interaction may proceed;
 based on the comparison, determining a channel through which the customer interaction between the customer and the customer interaction center will be conducted;
 during interaction with the customer, retrieving from a contact history database a contact history that corresponds to the customer, the contact history including information related to previous interactions between the customer and the customer interaction center;
 presenting the contact history to a Customer Service Representative (CSR); and
 interacting with the customer in accordance with the contact history, including
 receiving a request from a client computing device of the customer;
 determining whether the request originates from a first client computing device comprising a first processor or from a second client computing device comprising a second processor, wherein the first client computing device comprises a slower central processing unit or a lower resolution display than the second client computing device; and
 responding to the request by adjusting and customizing the level of graphics and data sent to the client device to a format compatible with the first client computing device if the request originated from the first client computing device; and
 responding to the request by adjusting and customizing the level of graphics and data sent to the client device to a format compatible with the second client computing device if the request originated from the second client computing device;
 observing at least one customer response to a specific question;
 creating a customer profile based on the observed customer response;
 recording the observed customer response to a specific question in a customer interaction database record;
 repeating the observing, creating and recording in a customer interaction database record steps until the completion of the interaction; and
 copying the customer interaction database record to the contact history database.

13. The method for interaction between a customer and a customer interaction center of claim 12 wherein determining a channel through which the customer interaction will be conducted comprises selecting a channel among all possible channels so that
 if the customer value does not exceed the predetermined customer value threshold, the customer is presented with a partial list of interaction options over the computer network and a selected interaction option listed on the partial list may be received from the customer over the computer network; and
 if the customer value exceeds the predetermined customer value threshold, the customer is presented with a complete list of interaction options over the computer network and a selected interaction option may be received from the customer over the computer network.

14. The method for interaction between a customer and a customer interaction center of claim 12, wherein the step of automatically calculating a customer value based on historical customer interaction information comprises the following steps:
 processing a customer request to purchase an item or service;
 retrieving historical customer interaction data associated with the customer from a customer value database;
 computing a customer value based on the customer request and the historical customer interaction data; and
 updating the customer value database.

* * * * *

UNITED STATES PATENT AND TRADEMARK OFFICE
CERTIFICATE OF CORRECTION

| | |
|---|---|
| PATENT NO. | : 7,353,182 B1 |
| APPLICATION NO. | : 09/608293 |
| DATED | : April 1, 2008 |
| INVENTOR(S) | : Jean L. Missinhoun et al. |

Page 1 of 1

It is certified that error appears in the above-identified patent and that said Letters Patent is hereby corrected as shown below:

<u>In the Specification</u>

In column 4, line 21, after "a completed" delete "an".

In column 7, line 22, before "interaction database" delete "a" and substitute --an-- in its place.

In column 8, line 20, before "customer interaction database" delete "an" and substitute --a-- in its place.

<u>In the Claims</u>

In columns 17-18, in claim 6, line 20, after "customer based" insert --on--.

Signed and Sealed this

Twenty-fourth Day of March, 2009

JOHN DOLL
*Acting Director of the United States Patent and Trademark Office*

UNITED STATES PATENT AND TRADEMARK OFFICE
CERTIFICATE OF CORRECTION

PATENT NO.         : 7,353,182 B1  
APPLICATION NO. : 09/608293  
DATED                 : April 1, 2008  
INVENTOR(S)       : Jean L. Missinhoun et al.

Page 1 of 1

It is certified that error appears in the above-identified patent and that said Letters Patent is hereby corrected as shown below:

In the Specification

In column 4, line 21, after "a completed" delete "an".

In column 7, line 22, before "interaction database" delete "a" and substitute --an-- in its place.

In column 8, line 20, before "customer interaction database" delete "an" and substitute --a-- in its place.

In the Claims

Column 18, in claim 6, line 1, after "customer based" insert --on--.

This certificate supersedes the Certificate of Correction issued March 24, 2009.

Signed and Sealed this

Fourteenth Day of April, 2009

JOHN DOLL  
*Acting Director of the United States Patent and Trademark Office*